United States Patent
Kenkel et al.

(10) Patent No.: US 11,249,508 B2
(45) Date of Patent: Feb. 15, 2022

(54) WORK VEHICLE MAGNETORHEOLOGICAL FLUID JOYSTICK SYSTEMS OPERABLE IN MODIFIED CENTERING MODES

(71) Applicant: Deere & Company, Moline, IL (US)

(72) Inventors: Aaron R. Kenkel, East Dubuque, IL (US); Alex R. Vandegrift, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 7 days.

(21) Appl. No.: 16/864,726

(22) Filed: May 1, 2020

(65) Prior Publication Data
US 2021/0341960 A1 Nov. 4, 2021

(51) Int. Cl.
*G05G 9/047* (2006.01)
*B62D 1/12* (2006.01)

(52) U.S. Cl.
CPC .............. *G05G 9/047* (2013.01); *B62D 1/12* (2013.01); *G05G 2009/0477* (2013.01); *G05G 2009/04755* (2013.01); *G05G 2009/04762* (2013.01)

(58) Field of Classification Search
None
See application file for complete search history.

(56) References Cited

U.S. PATENT DOCUMENTS

| 8,066,567 B2 | 11/2011 | Waggoner et al. |
| 8,972,125 B1 | 3/2015 | Elliott |
| 9,181,676 B2 | 11/2015 | Meislahn et al. |
| 9,771,705 B2 | 9/2017 | Horstman et al. |

(Continued)

FOREIGN PATENT DOCUMENTS

| DE | 19848191 A1 | 4/2000 |
| DE | 102004041690 A1 | 3/2005 |

(Continued)

OTHER PUBLICATIONS

Non-Final Office Action issued in Utility U.S. Appl. No. 16/864,696 dated Sep. 16, 2021.

(Continued)

*Primary Examiner* — Howard J Sanders
*Assistant Examiner* — Gregory T Prather
(74) *Attorney, Agent, or Firm* — Klintworth & Rozenblat IP LLP

(57) ABSTRACT

In embodiments, a work vehicle magnetorheological fluid (MRF) joystick system includes a joystick device, an MRF joystick resistance mechanism, and a controller architecture. The joystick device includes, in turn, a base housing, a joystick movably mounted to the base housing, and a joystick bias mechanism coupled to the joystick and exerting a centering force urging the joystick to return to the centered position when moved therefrom. The controller architecture is operable in a modified centering mode in which the controller architecture: (i) determines when the joystick begins return toward the centered position due to the centering force applied by the joystick bias mechanism; and (ii) when so determining, commands the MRF joystick resistance mechanism to modify a rate at which the joystick returns to the centered position by varying the MRF resistance force applied to the joystick.

20 Claims, 7 Drawing Sheets

(56) References Cited

U.S. PATENT DOCUMENTS

| | | | |
|---|---|---|---|
| 9,777,460 | B2 | 10/2017 | Wuisan et al. |
| 9,777,461 | B2 | 10/2017 | Wuisan et al. |
| 9,797,114 | B2 | 10/2017 | Maifield et al. |
| 10,061,343 | B2 | 8/2018 | Fredrickson et al. |
| 10,145,084 | B2 | 12/2018 | Fredrickson |
| 11,048,330 | B2 | 6/2021 | Eck et al. |
| 11,086,350 | B2 | 8/2021 | Wakuda et al. |
| 2001/0052893 | A1 | 12/2001 | Jolly et al. |
| 2006/0197741 | A1 | 9/2006 | Biggadike |
| 2013/0229272 | A1* | 9/2013 | Elliott .................... G05G 9/047 340/407.2 |
| 2016/0179128 | A1 | 6/2016 | Guglielmo |
| 2018/0058039 | A1* | 3/2018 | Fredrickson .......... E02F 9/2012 |
| 2019/0210854 | A1 | 7/2019 | Eck et al. |
| 2019/0286237 | A1* | 9/2019 | Eck ...................... G06F 3/0338 |
| 2020/0125132 | A1* | 4/2020 | Wakuda .................. G05G 5/02 |
| 2021/0286431 | A1 | 9/2021 | Eck et al. |
| 2021/0340723 | A1 | 11/2021 | Velde et al. |
| 2021/0340724 | A1 | 11/2021 | Kenkel et al. |
| 2021/0340725 | A1 | 11/2021 | Velde et al. |
| 2021/0340728 | A1 | 11/2021 | Graham et al. |
| 2021/0341032 | A1 | 11/2021 | Velde et al. |
| 2021/0341033 | A1 | 11/2021 | Breutzman et al. |
| 2021/0341960 | A1 | 11/2021 | Kenkel et al. |

FOREIGN PATENT DOCUMENTS

| | | |
|---|---|---|
| JP | 2014174726 A | 9/2014 |
| KR | 20190074555 A | 6/2019 |
| WO | 9642078 A1 | 12/1996 |

OTHER PUBLICATIONS

Farzad Ahmadkhanlou, Design, Modeling and Control of Magnetorheological Fluid-Based Force Feedback Dampers for Telerobotic Systems, ResearchGate, https://www.researchgate.net/publication/251697638, Apr. 2008 (19 pages).

Deere & Company, John Deere Motor Grader Left Dual Joystick Controls Tutorial, https://www.youtube.com/watch?v=iYxPlxzD8g4&feature=youtu.be&t=25, Mar. 7, 2017. (2 pages).

MRF Damper, FMR-70S-403 Brochure, undated admitted prior art. (3 pages).

Deere & Company, pending Utility U.S. Appl. No. 63/019,083, filed May 1, 2020.

Deere & Company, pending Utility U.S. Appl. No. 16/864,696, filed May 1, 2020.

Deere & Company, pending Utility U.S. Appl. No. 16/864,749, filed May 1, 2020.

Deere & Company, pending Utility U.S. Appl. No. 16/916,800, filed Jun. 30, 2020.

Deere & Company, pending Utility U.S. Appl. No. 16/922,321, filed Jul. 7, 2020.

Deere & Company, pending Utility U.S. Appl. No. 16/989,427, filed Aug. 10, 2020.

Deere & Company, pending Utility U.S. Appl. No. 17/002,052, filed Aug. 25, 2020.

Deere & Company, pending Utility U.S. Appl. No. 17/038,399, filed Sep. 30, 2020.

USPTO, Non-Final Office Action issued in Utility U.S. Appl. No. 17/002,052 dated Nov. 8, 2021.

* cited by examiner

WORK VEHICLE MAGNETORHEOLOGICAL FLUID JOYSTICK SYSTEMS OPERABLE IN MODIFIED CENTERING MODES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle magnetorheological fluid (MRF) joystick systems operable in modified centering modes; that is, modes in which an MRF-applied resistive force is utilized to vary the rate at which a self-centering joystick returns to a centered position after displacement therefrom.

BACKGROUND OF THE DISCLOSURE

Joystick devices are commonly utilized to control various operational aspects of work vehicles employed within the construction, agriculture, forestry, and mining industries. For example, in the case of a work vehicle equipped with a boom assembly, an operator may utilize one or more joystick devices to control boom assembly movement and, therefore, movement of a tool or implement mounted to an outer terminal end of the boom assembly. Common examples of work vehicles having such joystick-controlled boom assemblies include excavators, feller bunchers, skidders, tractors (on which modular front end loader and backhoe attachments may be installed), tractor loaders, wheel loaders, and various compact loaders. Similarly, in the case of dozers, motor graders, and other work vehicles equipped with earth-moving blades, an operator may utilize with one or more joysticks to control blade movement and positioning. Joystick devices are also commonly utilized to steer or otherwise control the directional movement of the work vehicle chassis in the case of motor graders, dozers, and certain loaders, such as skid steer loaders. Given the prevalence of joystick devices within work vehicles, taken in combination with the relatively challenging, dynamic environments in which work vehicles often operate, a continued demand exists for advancements in the design and function of work vehicle joystick systems, particularly to the extent that such advancements can improve the safety and efficiency of work vehicle operation.

SUMMARY OF THE DISCLOSURE

A work vehicle magnetorheological fluid (MRF) joystick system is disclosed for usage onboard a work vehicle. In embodiments, the work vehicle MRF joystick system architecture coupled to the MRF joystick resistance mechanism. The joystick device includes, in turn, a base housing, a joystick mounted to the base housing and movable relative thereto through a centered position, and a joystick bias mechanism coupled to the joystick and exerting a centering force urging the joystick to return to the centered position when the joystick is moved therefrom. The MRF joystick resistance mechanism is controllable to vary an MRF resistance force resisting movement of the joystick relative to the base housing in at least one degree of freedom. The controller architecture is operable in a modified centering mode in which the controller architecture: (i) determines when the joystick begins return toward the centered position due to the centering force applied to the joystick by the joystick bias mechanism; and (ii) in response to determining that the joystick begins return toward the centered position due to the centering force, commands the MRF joystick resistance mechanism to modify a rate at which the joystick returns to the centered position by varying the MRF resistance force applied to the joystick.

In further embodiments in which the MRF joystick system is deployed onboard a work vehicle equipped with boom assembly terminating in an implement, the work vehicle MRF joystick system includes a joystick device, an MRF joystick resistance mechanism, and a controller architecture coupled to the MRF joystick resistance mechanism. The joystick device includes, in turn, a base housing, a joystick mounted to the base housing and movable relative thereto through a centered position, and a joystick bias mechanism coupled to the joystick and exerting a centering force urging the joystick to return to the centered position when the joystick is moved therefrom. The MRF joystick resistance mechanism controllable to vary an MRF resistance force resisting movement of the joystick relative to the base housing. The controller architecture is configured determine when a first implement auto-positioning function of the work vehicle has been activated by movement of the joystick. When determining that the first implement auto-positioning function of the work vehicle has been activated, the controller architecture further (i) commands the boom assembly to move the implement from a current position to a preset position, and (ii) controls the MRF joystick resistance mechanism to adjust the MRF resistance force and vary a rate at which the joystick returns to the centered position as the implement moves from the current position to the preset position.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
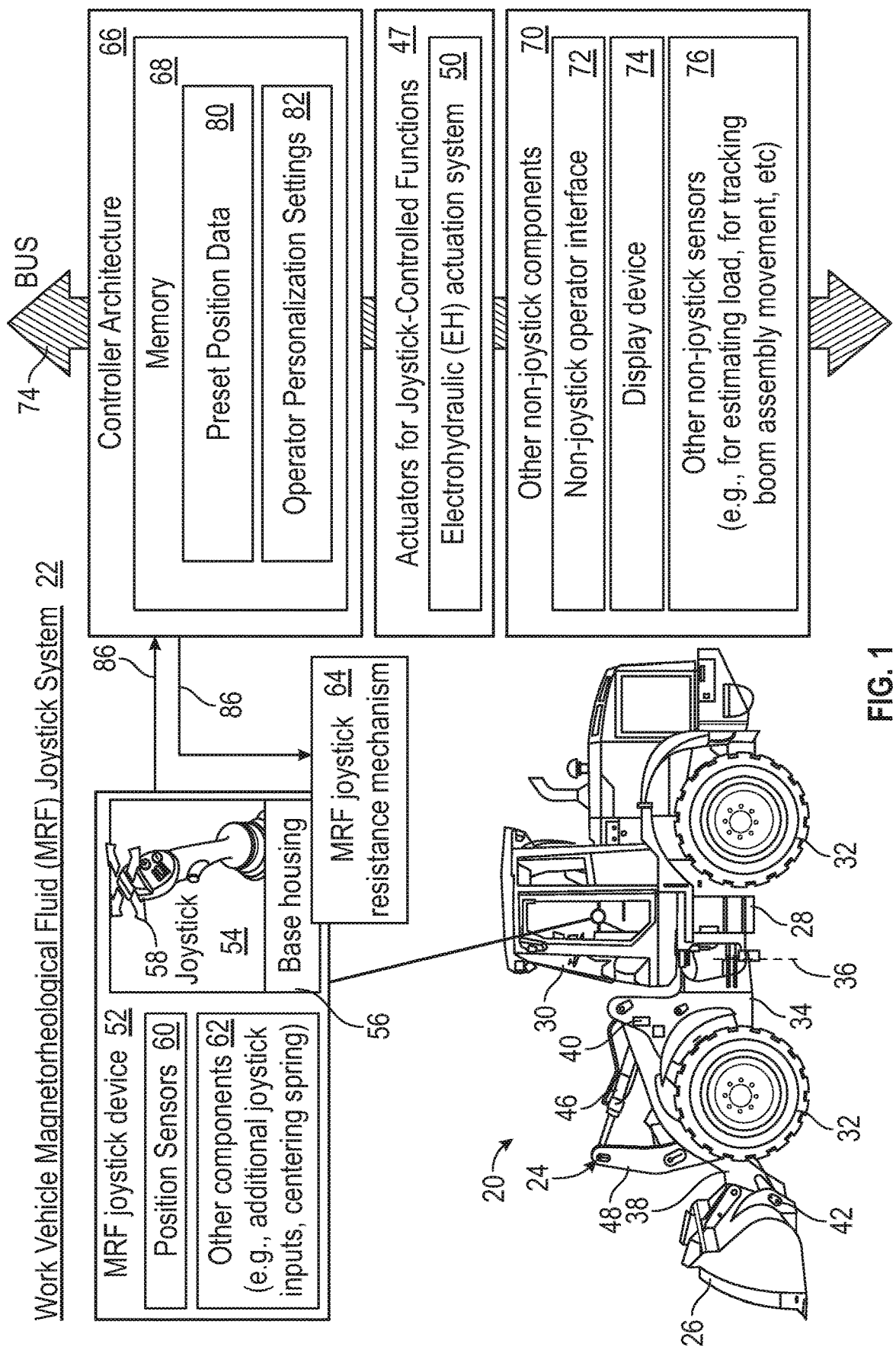
FIG. 1 is a schematic of an example magnetorheological fluid (MRF) joystick system onboard a work vehicle (here, a wheel loader) and operable in at least one modified centering mode, such as an auto-positioning mirror mode, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

As appearing herein, the term "work vehicle" includes all parts of a work vehicle or work machine. Accordingly, in implementations in which a front end loader (FEL) assembly or other boom assembly terminating in an implement is attached to the chassis of a work vehicle, the term "work vehicle" encompasses both the chassis and the boom assembly, as well as the implement or tool mounted to the terminal end of the boom assembly. Further, the term "centered position" refers to a home or neutral position toward which a self-centering joystick is biased. It is thus not required that the centered position is located at the precise geometric center of a joystick's range of motion in all instances; for example, in certain embodiments, it may be the case that the joystick of an MRF joystick device can be moved in a first direction starting from the centered position over a greater range of travel than the range of travel available to the joystick when moved in a second, opposing direction beginning from the centered position.

Overview

As discussed briefly above, joystick devices are commonly integrated into various types of work vehicles to provide intuitive, versatile operator interfaces for controlling a wide range of work vehicle functions. When containing a bias device or mechanism exerting a bias force (herein, a "centering force") urging joystick movement toward a centered (neutral) position, the joystick device is commonly referred to as "self-centering." Self-centering joystick devices often contain joystick biasing mechanisms in the form of one or more mechanical (e.g., wireform or machined) springs, but can also be implemented utilizing other joystick biasing mechanisms including gas springs and magnets. Relative to non-self-centering joystick devices, such as friction hold joystick devices, self-centering joystick devices tend to provide operators with an enhanced interactive experience or "feel," while further imparting operators with an intuitive sense of joystick displacement relative to the centered (neutral) position of the joystick at any given moment in time. This may, in turn, improve operator satisfaction levels and efficacy in performing joystick-controlled tasks. Self-centering joystick devices are not without limitations, however. For example, in instances in which certain automatic vehicle functions can be activated through predefined joystick movements, disparities can develop between joystick motion and position relative to the automated movements of the work vehicle function triggered by joystick motion, as further discussed below. Additionally, self-centering joystick devices typically provide a return-to-center (RTC) rate solely determined by the centering force and any frictional losses within the joystick device itself. Consequently, self-centering joystick devices are typically incapable of providing controlled variances in the RTC rate to, for example, better suit operator preferences, changes in the operative mode of the work vehicle, or changes in other conditions related to work vehicle operation.

As alluded to above, an electronic joystick, such as an electrohydraulic (EH) joystick, can be designed to allow the activation of certain work vehicle functions through joystick motion. In accordance with embodiments of the present disclosure, one such function well-suited for activation through certain predefined motions of the joystick is an implement auto-positioning or "kickout" function. When activated, such an implement auto-positioning function automates movement of an implement (typically by controlling movement of an FEL assembly or other boom assembly to which the implement is mounted) to transition the implement from its current position into a preset position. Such an implement auto-positioning function may be useful in the context of various types of work vehicles equipped with movable implements including, for example, excavators, feller bunchers, and tractors equipped with backhoes or FEL attachments. However, for purposes of explanation, the following description principally focuses on the example of a loader (e.g., a skid steer loader or a wheel loader) equipped with a bucket or similar implement. In the context of such a loader, two implement auto-positioning functions are usefully provided: a first implement auto-positioning function for automatically raising the FEL bucket (or other implement) to an upper preset position, and a second implement auto-positioning function for automatically lowering the FEL bucket to a lower preset position.

In embodiments of the present disclosure, and with continued reference to an example loader, an operator may trigger either one of these implement auto-positioning or "kickout" functions through predefined joystick motions. As a specific example, an operator may trigger or activate the implement auto-positioning function raising the FEL bucket to the upper preset position by moving the joystick into or through a first detent feature encountered when rotating the joystick in a rearward direction away from the joystick's centered position. Conversely, an operator may activate the implement auto-positioning function lowering the FEL bucket to the lower preset position, when desired, by moving the joystick into or through a second detent feature encountered when rotating the joystick in a forward direction away from the joystick's centered position. After rotating the joystick into or through one of the detent positions to trigger the corresponding implement auto-positioning function, the operator may then release the self-centering joystick, which then returns to its centered position under the influence of the centering force applied to the joystick by the joystick biasing mechanism incorporated into the joystick device.

Enabling the selective activation of such implement auto-positioning or "kickout" functions through predefined joystick motions, as just described, can be highly useful in instances in which an operator is required to repeatedly raise or lower the FEL bucket (or other implement) when a loader or other work vehicle is utilized to carry-out certain work tasks. As a more specific example, joystick motion-activation of implement auto-positioning functions may be particularly useful when a loader is utilized to fill the bed of a dump truck with a material, such as earth or gravel, gathered from a pile. In this case, an operator can initially set the upper preset position at an elevation immediately above the upper lip or sidewall of the dump truck bed. After controlling the loader to fill the FEL bucket with material, an operator need only pull the joystick in a rearward direction beyond the encountered detent feature to activate or trigger the implement auto-positioning function raising the FEL bucket into the upper preset position. The operator may then release the joystick to allow the joystick to quickly return or "snap back" to the centered position. Concurrently or shortly after this, the operator may steer the loader to position the now-raised FEL bucket over the dump truck bed, and then open the FEL bucket to dump the bucket load of material into the bed of the dump truck. Next, the operator may pilot the loader to remove FEL bucket from over the dump truck bed and rotate the joystick to active the implement auto-positioning function lowering the FEL bucket into the lower preset position. This prepares the loader to gather another bucket load of material, thereby allowing the operator to repeat the above-described process steps as needed to efficiently fill the dump truck bed to the desired capacity. Operator convenience is thus greatly increased by reducing manual demands placed on the operator in interacting with the joystick device to complete the work task. Further, movement of the implement between the upper and lower preset positions occurs in a highly consistent and efficient manner due to usage of the implement auto-positioning functions.

While beneficial for the reasons set-out above, the provision of implement auto-positioning or "kickout" functions activated through motion of self-centering joystick remains associated with certain drawbacks, such as a tendency to evoke some level of confusion or concern in the case of operators unfamiliar with auto-positioning functions. Such confusion may arise when, for example, an operator inadvertently triggers an implement auto-positioning function and releases the self-centering joystick, which then quickly returns to the centered (neutral) position under influence of the centering force applied to the joystick device. As the joystick returns to the centered position under the centering force, and again utilizing the example of a loader, movement of the FEL assembly continues to bring the FEL bucket into the appropriate preset position. The relationship between motion of the joystick and movement of the FEL assembly is thus temporarily interrupted or severed as the implement auto-positioning function is executed. Consequently, an operator unfamiliar with implement auto-positioning functions may become discomforted by the sudden dissociation between joystick motion and FEL assembly movement. This is understandable and is desirably avoided to the extent possible.

The following describes work vehicle magnetorheological fluid (MRF) joystick systems operable in modified centering modes; that is, modes of operation in which the rate at which a self-centering joystick returns to a centered position is altered or adjusted in a controlled manner through usage of an MRF joystick resistance mechanism. Embodiments of the MRF joystick system, when operating in a modified centering mode, leverage MRF technology to vary the return-to-center (RTC) rate of a self-centering joystick relative to the rate at which the joystick would otherwise normally return to the center (neutral) position by virtue of the centering force applied by a joystick bias mechanisms (e.g., one or more springs, magnets, or the like) integrated into the joystick device. In embodiments, the MRF joystick system may modify the rate at which the RTC rate of joystick based on a current operational mode of the work vehicle, based on a current load of the work vehicle, based on a current speed of the work vehicle, or based on another sensed parameter pertaining in the work vehicle. Additionally or alternatively, embodiment of the work vehicle MRF joystick system may enable operators to modify the rate at which the joystick returns to the centered position in accordance with operator preference settings. Other modified centering modes are also possible, as will become apparent from the following description.

One modified centering mode, which is particularly useful in the context of loaders and other work vehicles imparted with implement auto-positioning functions triggered by joystick motions, is referred to hereafter as an "auto-positioning mirror mode." The MRF joystick system may enter into such an auto-positioning mirror mode in conjunction with activation of an implement auto-positioning function through movement of an MRF joystick device. Subsequently, when operating in the auto-positioning mirror mode, the MRF joystick system may vary the RTC rate of the joystick to correspond (e.g., to be substantially proportional with) the rate at which an implement, such as an FEL bucket, is moved into a preset position following activation of a given implement auto-positioning or kickout function. In so doing, the MRF joystick system maintains an improved correlation between joystick motion and implement movement during execution of the implement auto-positioning function. This, in turn, brings machine performance into closer harmony with operator expectations. Further benefits are achieved through the usage of MRF technology itself as opposed to the usage of other mechanisms, such as actuated friction or brake mechanisms, also capable of selectively impeding joystick motion when returning to a centered position after displacement therefrom. Such benefits may include highly abbreviated response times; minimal frictional losses in the absence of MRF-applied resistive forces; reliable, essentially noiseless operation; and other benefits as further discussed below. Additionally, embodiments of the below-described MRF joystick resistance mechanims may be capable of generate a continuous range of resistive forces over a resistive force range in relatively precise manner and in accordance with commands or control signals issued by a processing subsystem or "controller architecture" of the MRF joystick system, as further described herein. This, in turn, may allow detent features of an MRF joystick device to be selectively added, removed, repositioned, and adjusted in force (e.g., to meet operator preferences) during operation of the work vehicle MRF joystick system.

An example embodiment of a work vehicle MRF joystick system will now be described in conjunction with FIGS. 1-7. In the below-described example embodiment, the MRF joystick system is principally discussed in the context of a particular type of work vehicle, namely, a wheel loader equipped with an FEL bucket. Additionally, in the following example, the MRF joystick system contains a single joystick device, which includes a joystick rotatable about two perpendicular axes. The following example notwithstanding, the MRF joystick system may include a greater number of joystick devices in further embodiments (e.g., two or more joystick devices), with each joystick device movable in any number of degrees of freedom (DOFs) and along any suitable motion pattern; e.g., in alternative implementations, a given joystick device may be rotatable about a single axis or, perhaps, movable along a limited (e.g., H-shaped or plus-shaped) track or motion pattern. Moreover, the below-described MRF joystick system can be deployed onboard a wide range of work vehicles including joystick-controlled functions and employed in the agricultural, construction, mining and forestry industries, additional examples of which are discussed below in connection with FIG. 8.

Example MRF Joystick Systems Operable in Modified Centering Modes

Figure 2:
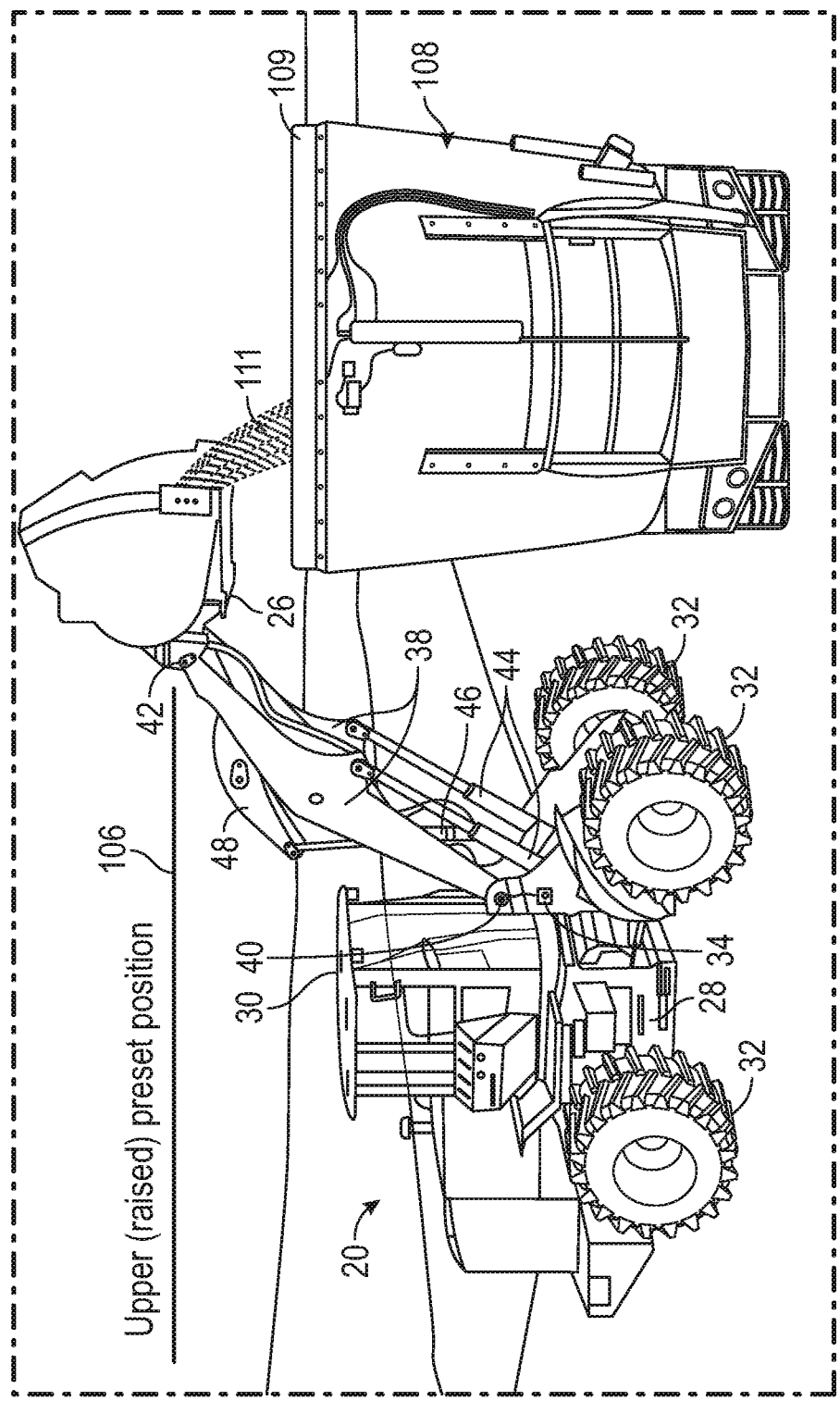
FIG. 2 is a perspective viewed of the wheel loader shown in FIG. 1 illustrating one manner in which a front end loader (FEL) bucket of the example wheel loader may be automatically raised to an upper preset position in response to joystick activation of an implement auto-positioning or "kickout" function.

Referring initially to FIGS. 1 and 2, an example work vehicle (here, a wheel loader 20) equipped with a work vehicle MRF joystick system 22 is presented. In addition to the MRF joystick system 22, the wheel loader 20 includes an FEL assembly 24 terminating in a tool or implement, such an FEL bucket 26. Various other implements, such as other types of FEL buckets, can be interchanged with the FEL bucket 26 in embodiments. The following description is equally applicable to other types of work vehicles equipped with boom-mounted implements, including excavators, feller bunchers, and tractors on which FEL attachments or backhoe attachments are installed, regardless of the particular tool or implement mounted to the terminal end of the boom assembly. The wheel loader 20 features a main body or chassis 28, a cabin 30 located at forward portion of the main chassis 28 and enclosing an operator station, and ground engaging wheels 32 supporting the main chassis 28. In this particular example, the wheel loader 20 has an articulated body such that a forward portion or frame 34 of the loader 20 can rotate relative to the main chassis 28 about an axis 36 (FIG. 1).

The FEL assembly 24 of the wheel loader 20 contains twin booms or lift arms 38, which extend from the main chassis 28 in a forward direction to the backside of the FEL bucket 26. At one end, each lift arm 38 is joined to the forward frame 34 of the wheel loader via a first pin or pivot joint 40. At the longitudinally-opposing end, each lift arm 38 is joined to the FEL bucket 26 via a second pin or pivot joint 42. As shown most clearly in FIG. 2, two lift arm cylinders 44 are further mounted between the forward frame 34 of the wheel loader 20 and the lift arms 38. Extension of the lift arm cylinders 44 thus results in rotation of the lift arms 38 about the pivot joints 40 and upward motion of the FEL bucket 26. The wheel loader 20 also includes a bucket cylinder 46, which is mechanically coupled between the forward frame 34 and a linkage 48. A central portion of the linkage 48 is, in turn, rotatably or pivotally mounted between the lift arms 38, while an end portion of the linkage is pivotally joined to the FEL bucket 26 opposite the bucket cylinder 46. The linkage 48 may be a four bar linkage, a Z-linkage, or a similar linkage suitable for converting translation of the bucket cylinder 46 into rotation (curling or uncurling) of the FEL bucket 26.

The hydraulic cylinders 44, 46 are included in an electrohydraulic (EH) actuation system, which is encompassed by a box 50 entitled "actuators for joystick-controlled functions" in FIG. 1. FEL assembly movements are controlled utilizing a joystick located within the loader cabin 30 and included in the MRF joystick system 22. Specifically, and as schematically illustrated in an upper left portion of FIG. 1, an operator may utilize a an MRF joystick 54 included in the MRF joystick system 22 to control the extension and retraction of the hydraulic cylinders 44, 46. The depicted EH actuation system 50 also contains various other non-illustrated hydraulic components, which may include flow lines (e.g., flexible hoses), check or relief valves, pumps, a, fittings, filters, and the like. Additionally, the EH actuation system 50 contains electronic valve actuators and flow control valves, such as spool-type multi-way valves, which can be modulated to regulate the flow of pressurized hydraulic fluid to and from the hydraulic cylinders 44, 46. This stated, the particular construction or architecture of the EH actuation system 50 is largely inconsequential to embodiments of the present disclosure, providing that the below-described controller architecture is capable of controlling movement of the FEL assembly 24 via commands transmitted to selected ones of the actuators 47 effectuating the joystick controlled functions of the wheel loader 20.

As just noted, the work vehicle MRF joystick system 22 contains at least one MRF joystick device 52. As appearing herein, the term "MRF joystick device" refers to an operator input device including at least one joystick or control lever, the movement of which can be impeded by a variable resistance force applied utilizing an MRF joystick resistance mechanism of the type described herein. As schematically illustrated in FIG. 1, the MRF joystick device 52 includes a joystick 54 mounted to a lower support structure or base housing 56. The joystick 54 is movable relative to the base housing 56 in at least one DOF and may be rotatable relative to the base housing 56 about one or more axes. In the depicted embodiment, and as indicated by arrows 58, the joystick 54 of the MRF joystick device 52 is rotatable relative to the base housing 56 about two perpendicular axes and will be described below as such. The MRF joystick device 52 includes one or more joystick position sensors 60 for monitoring the current position and movement of the joystick 54 relative to the base housing 56. Various other components 62 may also be included in the MRF joystick device 52 including buttons, dials, switches, or other manual input features, which may be located on the joystick 54 itself, located on the base housing 56, or a combination thereof. Spring elements (gas or mechanical), magnets, or fluid dampers may be incorporated into the joystick device 52 to provide a desired rate of return to the centered (neutral or home) position of the joystick, as well as to fine-tune the desired feel of the joystick 54 perceived by an operator when interacting with the MRF joystick device 52. The element or elements incorporated into the MRF joystick device 52 and exerting a bias force (herein, a "centering force") on the joystick 54 urging return of the joystick 54 to the centered position are generally referred to herein as a "joystick bias mechanism."

With continued reference to FIG. 1, an MRF joystick resistance mechanism 64 is at least partially integrated into the base housing 56 of the MRF joystick device 52 or otherwise coupled to the joystick 54. The MRF joystick resistance mechanism 64 can be controlled to adjust the MRF resistance force and, therefore, joystick stiffness resisting joystick motion relative to the base housing 56 in at least one DOF. During operation of the MRF joystick system 22, the below-described controller architecture 66 may selectively command the MRF joystick resistance mechanism 64 to increase the joystick stiffness or MRF resistance force impeding joystick rotation about a particular axis or combination of axes. In this regard, the controller architecture 66 may command the MRF joystick resistance mechanism 64 to varying the MRF resistance force applied to the joystick 54 to modify a rate at which the joystick returns to the centered position when the MRF joystick system 22 operates in a modified centering mode, as discussed more fully below. Such controlled variations in MRF resistance force are achieved by adjusting the strength of an EM field in which a magnetorheological fluid (as contained in the MRF joystick resistance mechanism 64) is at least partially immersed. A generalized example of one manner in which the MRF joystick resistance mechanism 64 may be realized is described below in connection with FIGS. 5 and 6.

Embodiments of the MRF joystick system 22 further include a controller architecture 66, a memory 68 associated with the controller architecture 66, and any number of other non-joystick components 70. Such additional non-joystick components 70 may include an operator interface 72 (distinct from the MRF joystick device 52), a display device 74 located in the loader cabin 30, and various other non-joystick sensors 76. The operator interface 72, in particular, can include any number and type of non-joystick input devices for receiving input from an operator of the wheel loader 20, such as buttons, switches, knobs, and similar manual inputs external to the MRF joystick device 52. Such input devices included in the operator interface 72 can also include cursor-type input devices, such as a trackball or joystick, for interacting with a graphical user interface (GUI) generated on the display device 74. The display device 74 may be located within the cabin 30 and may assume the form of any image-generating device on which visual alerts and other information may be visually presented. The display device 74 may also generate a GUI for receiving operator input or may include other inputs (e.g., buttons or switches) for receiving operator input, which may be pertinent to the controller architecture 66 when performing the below-described processes. In certain instances, the display device 74 may have touch input capabilities.

Finally, the MRF joystick system 22 can include various other non-joystick sensors 76, which provide the controller architecture 66 with data inputs utilized in carrying-out the below-described processes. For example, the non-joystick sensors 76 can include sensors for automatically determining the type of implement currently attached to the wheel loader 20 (or other work vehicle) in at least some implementations when this information is considered by the controller architecture 66 in determining when to activate an modified centering mode; e.g., such sensors 76 may determine a particular implement type currently attached to the wheel loader 20 by sensing a tag (e.g., a radio frequency identification tag) or reading other identifying information present on the implement, by visual analysis of a camera feed capturing the implement, or utilizing any other technique. Additionally or alternatively, the non-joystick sensors 76 may include sensors for measuring parameters indicative of load, such a hydraulic pressure within a flow circuit of the EH actuation system 50 or the load carried by FEL bucket 26 at any given point in time. The non-joystick sensors 76 may still further provide other data to controller architecture 66, such as data indicating a current orientation or speed of the wheel loader 20; e.g., as determined utilizing a Global Positioning System (GPS) module; determined utilizing microelectromechanical systems (MEMS) gyroscopes, accelerometers, or magnetometers affixed to the wheel loader 20 at one or more locations; determined by measuring the rotation rate of the wheels 32; or determined in any other manner.

As further schematically depicted in FIG. 1, the controller architecture 66 may communicate with the various illustrated components over any number of wired data connections, wireless data connections, or any combination thereof; e.g., as generically illustrated, the controller architecture 66 may receive data from various components over a centralized vehicle or a controller area network (CAN) bus 78. The term "controller architecture," as appearing herein, is utilized in a non-limiting sense to generally refer to the processing subsystem of a work vehicle MRF joystick system, such as the example MRF joystick system 22. Accordingly, the controller architecture 66 can encompass or may be associated with any practical number of processors, individual controllers, computer-readable memories, power supplies, storage devices, interface cards, and other standardized components. In many instances, the controller architecture 66 may include a local controller directly associated with the joystick interface and other controllers located within the operator station enclosed by the loader cabin 30, with the local controller communicating with other controllers onboard the wheel loader 20 as needed. The controller architecture 66 may also include or cooperate with any number of firmware and software programs or computer-readable instructions designed to carry-out the various process tasks, calculations, and control functions described herein. Such computer-readable instructions may be stored within a non-volatile sector of the memory 68 associated with (accessible to) the controller architecture 66.

While generically illustrated in FIG. 1 as a single block, the memory 68 of the work vehicle MRF joystick system 22 can encompass any number and type of storage media suitable for storing computer-readable code or instructions, as well as other data utilized to support the operation of the MRF joystick system 22. The memory 68 may be integrated into the controller architecture 66 in embodiments as, for example, a system-in-package, a system-on-a-chip, or another type of microelectronic package or module. The memory 68 may also store certain information useful in implementing the modified centering modes in embodiments. As schematically indicated, this may include data 80 defining one or more preset positions of the FEL bucket 26, such as the below-described upper and lower preset positions. Additionally or alternatively, the memory 68 may store personalization settings 82 (e.g., an operator-preferred return to center rate of the joystick 54) when an operator utilizes the MRF joystick system 22 to tune the rate of joystick return to preference, as further discussed below.

Figure 3:
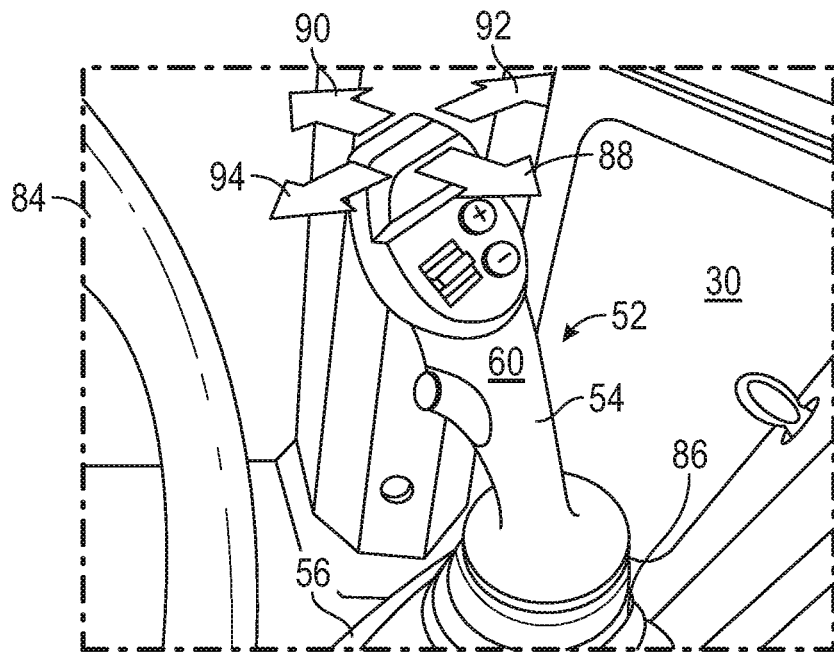
FIG. 3 is a perspective view from within the wheel loader cabin shown in FIG. illustrating a joystick device suitably included in the example MRF joystick system and utilized by an operator to control FEL movement in embodiments.
Figure 4:
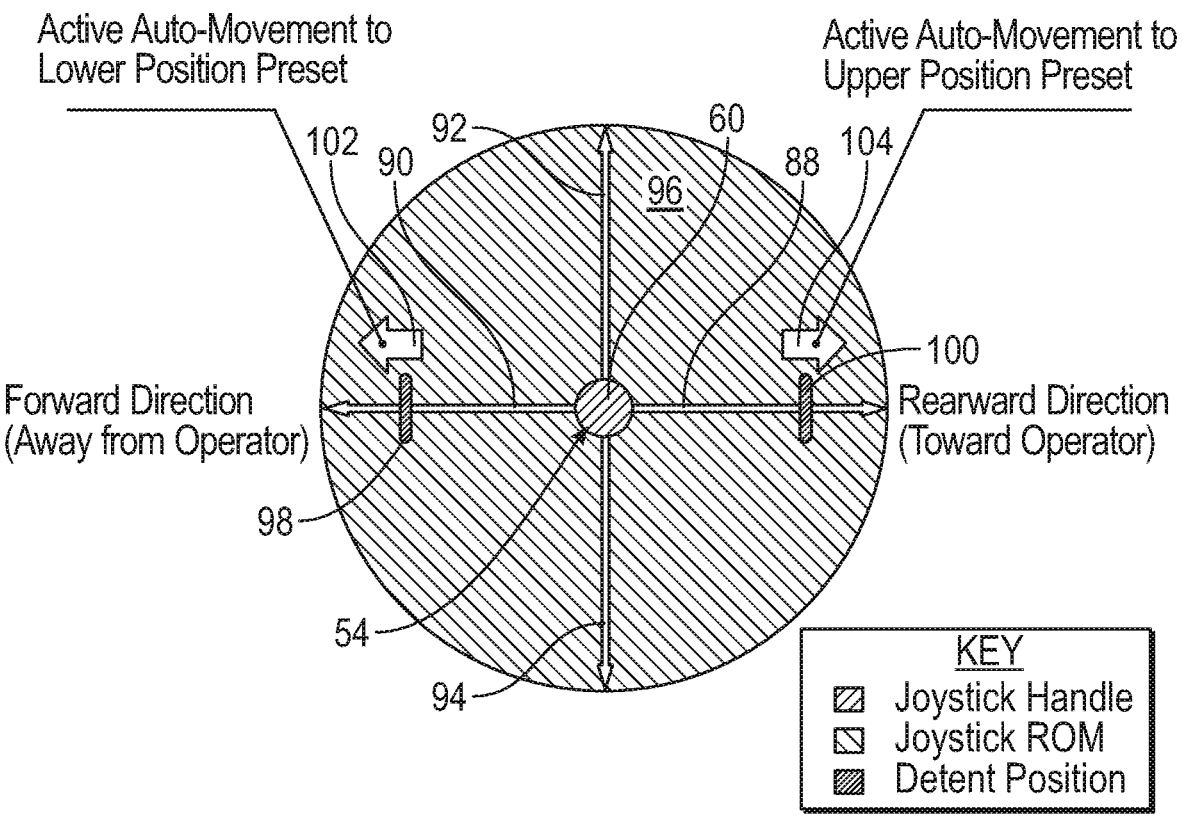
FIG. 4 is a schematic illustrating a range of motion of the example MRF joystick device and detent features into or through which an operator may rotate the joystick to activate implement auto-positioning functions in embodiments.

Turning now to FIG. 3, there is shown a perspective view from within the loader cabin 30 in which the exterior of the MRF joystick device 52, and particularly an upper portion of the joystick 54, can be seen in great detail. In this example, the MRF joystick device 52 is positioned to the right of a steering wheel 84, which is utilized to steer the wheel loader 20 and which may be located directly forward of an operator's seat (not shown). Carrying forward the reference numerals introduced above in connection with FIG. 1, the MRF joystick device 52 includes a joystick 54 mounted to a lower support structure or base housing 56 for rotation relative to the base housing 56 through a centered or neutral position about two perpendicular axes. The joystick device 52 also includes a flexible cover or boot 86, which is joined between a lower portion of the joystick 54 and the stationary base housing 56. Additional joystick inputs are also provided on the joystick 54 in the form of thumb-accessible buttons and, perhaps, as other non-illustrated manual inputs (e.g., buttons, dials, and or switches) provided on the base housing 56.

Different control schemes can be utilized to translate motion of the joystick 54 to corresponding movement of the FEL assembly 24. In one common (backhoe) control scheme, movement of the joystick 54 in a rearward direction (corresponding to arrow 88 in FIG. 3) causes extension of the lift arm cylinders 44, rotating the forward ends of the lift arms 38 upwardly, and raising the FEL bucket 26. Conversely, movement of the joystick 54 in a forward direction (corresponding to arrow 90) causes lift arm cylinders 44 to retract, the forward ends of the lift arms 38 to rotate downwardly, and the FEL bucket 26 to lower. Joystick movement to the right (corresponding to arrow 92) causes the bucket cylinder 46 to extend and the FEL bucket to curl inwardly or "close," while joystick movement to the left (corresponding to arrow 94) causes the bucket cylinder 46 to retract and the FEL bucket 26 to uncurl or "open." The joystick arrows 88, 90, 92, 94 are further carried-over to FIG. 4, which is a schematic diagram illustrating the ROM 96 of the example joystick 54 and certain detent features 98, 100 that may be further encountered during joystick rotation and utilized to activate implement auto-positioning functions of the wheel loader 20. Specifically, in the illustrated example, rotation of the joystick 54 from the centered position shown in FIGS. 3 and 4, in the forward direction, and into or through the detent feature 98 triggers the implement auto-positioning or "kickout" function raising the FEL bucket 26 to the upper preset position. Conversely, rotation of the joystick 54 from the centered position, in the rearward direction, and into or through the detent feature 100 triggers the implement auto-positioning or "kickout" function lowering the FEL bucket 26 to the lower preset position Operator convenience may be enhanced through the usage of the implement auto-positioning functions when piloting the wheel loader 20 to perform certain work tasks, such as a filling task during which the FEL bucket 26 is repeatedly moved between two elevations; e.g., a lower position for gathering bucket loads of material from a pile and an upper position from dumping the bucket loads of material into a receptacle. Further illustrating this point, FIG. 2 depicts the filling of a dump truck 108 with bucket loads of a material 111, which are delivered into the bed of the dump truck 108 via the wheel loader 20. Prior to beginning this task, an operator may initially set the upper preset position by interacting with the MRF joystick device 52 and the operator interface 72; e.g., the operator may control the MRF joystick device 52 to raise the FEL bucket 26 to a desired position and then provide additional operator input (e.g., via selection of a button provided on the joystick 54 or elsewhere, or via interaction with a GUI generated on the display device 74) to set the current bucket position as the upper preset position via (again, stored as part of the present position data 80 in the memory 68). Absent such operator input, the upper preset position may default to the fully raised position of the FEL bucket 26. A similar process may be followed to set the lower preset position of the FEL bucket 26, or the lower preset position of the FEL bucket 26 may be automatically set at a grounded position or near ground position.

Ideally, when setting the upper preset position of the FEL bucket 26 prior to filling the dump truck 108, an operator adjusts the upper preset position to bring the FEL bucket 26 to an elevation above the upper lip or sidewall 109 of the dump truck bed, as indicated in FIG. 2 by a horizontal line 106 identifying an ideal upper preset position setting for the FEL bucket 26. Subsequently, at an appropriate juncture during the ensuring work task (e.g., after gathering material into the FEL bucket 26), an operator may utilize the MRF joystick device 52 to trigger the implement auto-positioning function moving the FEL bucket 26 into the upper preset position. Following this, while the FEL bucket 26 is in the process of being automatically raised into the upper preset position (FIG. 2), or shortly after the FEL bucket 26 is raised into the upper preset position, the operator may begin to pilot the wheel loader 20 to position the FEL bucket 26 vertically over the bed of the dump truck 108. The operator may then open or downwardly tilt the FEL bucket 26 utilizing the MRF joystick device 52 to dump the gathered material 111 into the dump truck bed. Afterwards, the operator may control the wheel loader 20 to move the FEL bucket 26 from over the dump truck bed, while returning the FEL bucket 26 to a lowered "scoop" position, perhaps by triggering the implement auto-positioning function automatically moving the FEL bucket 26 to the lower preset position, as previously described.

Temporary confusion can arise when an operator, unfamiliar with the above-described implement auto-positioning functions, inadvertently triggers either of the functions when interacting with the MRF joystick device 52. As a primary reason for such confusion, the association between joystick motion and the FEL assembly movement is disrupted during execution of a given implement auto-positioning function. This disruption is pronounced when an operator moves the joystick 54 into or through one of the detent features 98, 100, the operator releases the joystick 54 (or exerts minimal force thereon), and the joystick 54 rapidly returns to the centered (neutral) position due to the centering force applied to the joystick 54 by the joystick bias mechanims within the MRF joystick device 52. To better preserve the relationship between joystick motion and FEL assembly movement during an implement auto-positioning function, and thereby reduce the likelihood of operator confusion in such scenarios, embodiments of the example work vehicle MRF joystick system 22 is operable in a unique modified centering mode in which an MRF-applied resistive force is applied to the joystick 54 to control the RTC rate of joystick 54 in a manner generally corresponding to (e.g., substantially proportional with) the rate at which the FEL bucket 26 moves into a preset position during execution of an implement auto-positioning function. This type of modified centering mode is referred to herein as an "auto-positioning mirror mode" and is described more fully below in connection with FIG. 7. Further, other modified centering modes potentially implemented utilizing the work vehicle MRF joystick system 22 are also discussed below and can be selectively performed in addition to, or in lieu of, such an auto-positioning mirror mode. First, however, a description of one possible construction of MRF joystick device 52 and the MRF joystick resistance mechanism 64 is provided in connection with FIGS. 5 and 6.

Figure 5:
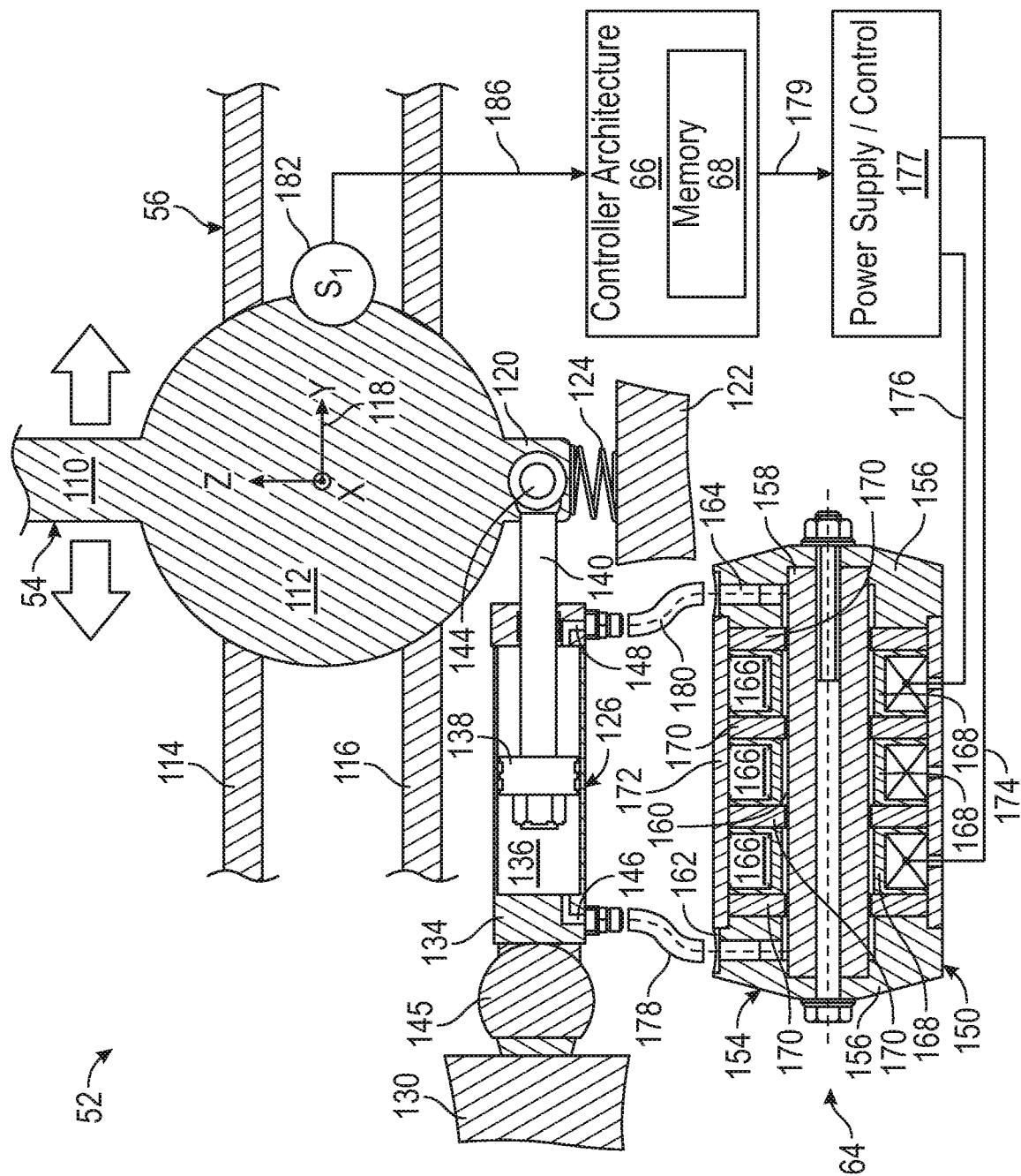
FIGS. 5 and 6 are cross-sectional schematics of the example MRF joystick system, as partially shown and taken along perpendicular section planes through a joystick included in a joystick device, illustrating one possible construction of the MRF joystick system.
Figure 6:
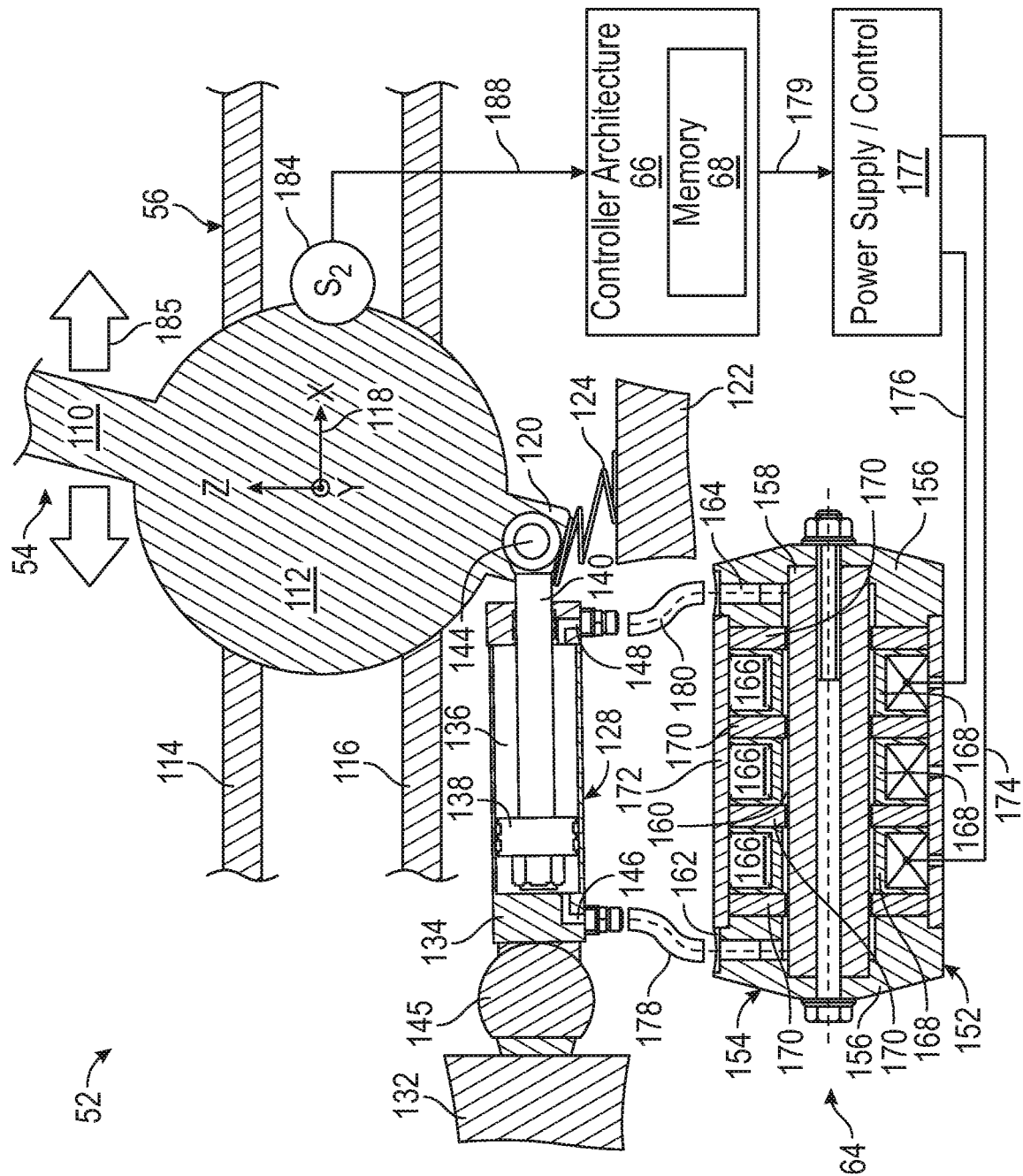

Progressing to FIGS. 5 and 6, an example construction of the MRF joystick device 52 and the MRF joystick resistance mechanism 64 is represented by two simplified cross-sectional schematics. The following description is provided by way of non-limiting example only, noting that numerous different joystick designs incorporating or functionally cooperating with MRF joystick resistance mechanisms are possible. The particular composition of the magnetorheological fluid largely is also inconsequential to embodiments of the present disclosure, providing that meaningful variations in the rheological properties (viscosity) of the magnetorheological fluid occur in conjunction with controlled variations in EM field strength, as described below. For completeness, however, is noted that one magnetorheological fluid composition well-suited for usage in embodiments of the present disclosure contains magnetically-permeable (e.g., carbonyl iron) particles dispersed in a carrier fluid, which is predominately composed of an oil or an alcohol (e.g., glycol) by weight. Such magnetically-permeable particles may have an average diameter (or other maximum cross-sectional dimension if the particles possess a non-spherical (e.g., oblong) shape) in the micron range; e.g., in one embodiment, spherical magnetically-permeable particles are used having an average diameter between one and ten microns. Various other additives, such as dispersants or thinners, may also be included in the magnetorheological fluid to fine-tune the properties thereof.

Referring now to the example joystick construction shown in FIGS. 5 and 6, and again carrying forward the previously-introduced reference numerals as appropriate, the MRF joystick device 52 includes a joystick 54 having at least two distinct portions or structural regions: an upper handle 110 (only a simplified, lower portion of which is shown in the drawing figures) and a lower, generally spherical base portion 112 (hereafter, the "generally spherical base 112"). The generally spherical base 112 of the joystick 54 is captured between two walls 114, 116 of the base housing 56, which may extend substantially parallel to one another to form an upper portion of the base housing 56. Vertically-aligned central openings are provided through the housing walls 114, 116, with the respective diameters of the central openings dimensioned to be less than the diameter of the generally spherical base 112. The spacing or vertical offset between the walls 114, 116 is further selected such that the bulk of generally spherical base 112 is captured between the vertically-spaced housing walls 114, 116 to form a ball-and-socket type joint. This permits rotation of the joystick 54 relative to the base housing 56 about two perpendicular axes, which correspond to the X- and Y-axes of a coordinate legend 118 appearing in FIGS. 5 and 6; while generally preventing translational movement of the joystick 54 along the X-, Y-, and Z-axes of the coordinate legend 118. In further embodiments, various other mechanical arrangements can be employed to mount a joystick to a base housing, while allowing rotation of the joystick about two perpendicular axis, such as a gimbal arrangement. In less complex embodiments, a pivot or pin joint may be provided to permit rotation of the joystick 54 relative to the base housing 56 about a single axis.

The joystick 54 of the MRF joystick device 52 further includes a stinger or lower joystick extension 120, which projects from the generally spherical base 112 in a direction opposite the joystick handle 110. The lower joystick extension 120 is coupled to a static attachment point of the base housing 56 by a single return spring 124 in the illustrated schematic; here noting that such an arrangement is simplified for the purposes of illustration and more complex spring return arrangements (or other joystick biasing mechanisms, if present) will typically be employed in actual embodiments of the MRF joystick device 52. When the joystick 54 is displaced from the centered (neutral or home) position shown in FIG. 5, the return spring 124 deflects as shown in FIG. 6 to urge return of the joystick 54 to the centered position (FIG. 5). Consequently, as an example, after rotation into the position shown in FIG. 6, the joystick 54 will return to the centered position shown in FIG. 5 under the influence of the return spring 124 should the work vehicle operator subsequently release the joystick handle 110. In other implementations, the MRF joystick device 52 may contain a different type of joystick biasing mechanism, such as one or more gas springs, permanent magnets, or electromagnets cooperating to provide the desired centering force urging return of the joystick 54 to the center position when displaced therefrom.

The example MRF joystick resistance mechanism 64 includes a first and second MRF cylinders 126, 128 shown in FIGS. 5 and 6, respectively. The first MRF cylinder 126 (FIG. 5) is mechanically joined between the lower joystick extension 120 and a partially-shown, static attachment point or infrastructure feature 130 of the base housing 56. Similarly, the second MRF cylinder 128 (FIG. 6) is mechanically joined between the lower joystick extension 120 and a static attachment point 132 of the base housing 56, with the MRF cylinder 128 rotated relative to the MRF cylinder 126 by approximately 90 degrees about the Z-axis of the coordinate legend 118. Due to this structural configuration, the MRF cylinder 126 (FIG. 5) is controllable to selectively resist rotation of the joystick 54 about the X-axis of coordinate legend 118, while the MRF cylinder 128 (FIG. 6) is controllable to selectively resist rotation of the joystick 54 about the Y-axis of coordinate legend 118. Additionally, both MRF cylinders 126, 128 can be jointly controlled to selectively resist rotation of the joystick 54 about any axis falling between the X- and Y-axes and extending within the X-Y plane. In other embodiments, a different MRF cylinder configuration may be utilized and include a greater or lesser number of MRF cylinders; e.g., in implementations in which it is desirable to selectively resist rotation of joystick 54 about only the X-axis or only the Y-axis, or in implementations in which joystick 54 is only rotatable about a single axis, a single MRF cylinder or a pair of antagonistic cylinders may be employed. Finally, although not shown in the simplified schematics, any number of additional components can be included in or associated with the MRF cylinders 126, 128 in further implementations. Such additional components may include sensors for monitoring the stroke of the cylinders 126, 128 if desirably known to, for example, track joystick position in lieu of the below-described joystick sensors 182, 184.

The MRF cylinders 126, 128 each include a cylinder body 134 to which a piston 138, 140 is slidably mounted. Each cylinder body 134 contains a cylindrical cavity or bore 136 in which a head 138 of one of the pistons 138, 140 is mounted for translational movement along the longitudinal axis or centerline of the cylinder body 134. About its outer periphery, each piston head 138 is fitted with one or more dynamic seals (e.g., O-rings) to sealingly engaging the interior surfaces of the cylinder body 134, thereby separating the bore 136 into two antagonistic variable-volume hydraulic chambers. The pistons 138, 140 also each include an elongated piston rod 140, which projects from the piston head 138 toward the lower joystick extension 120 of the joystick 54. The piston rod 140 extends through an end cap 142 affixed over the open end of the cylinder body 134 (again, engaging any number of seals) for attachment to the lower joystick extension 120 at a joystick attachment point 144. In the illustrated example, the joystick attachment points 144 assume the form of pin or pivot joints; however, in other embodiments, more complex joints (e.g., spherical joints) may be employed to form this mechanical coupling. Opposite the joystick attachment points 144, the opposing end of the MRF cylinders 126, 128 are mounted to the respective static attachment points 130, 132 via spherical joints 145. Finally, hydraulic ports 146, 148 are further provided in opposing end portions of each MRF cylinder 126, 128 to allow the inflow and outflow of magnetorheological fluid in conjunction with translational movement or stroking of the pistons 138, 140 along the respective longitudinal axes of the MRF cylinders 126, 128.

The MRF cylinders 126, 128 are fluidly interconnected with corresponding MRF values 150, 152, respectively, via flow line connections 172, 180. As is the case with the MRF cylinders 126, 128, the MRF valves 150, 152 are presented as identical in the illustrated example, but may vary in further implementations. Although referred to as "valves" by common terminology (considering, in particular, that the MRF valves 150, 152 function to control magnetorheological fluid flow), it will be observed that the MRF valves 150, 152 lack valve elements and other moving mechanical parts in the instant example. As a beneficial corollary, the MRF valves 150, 152 provide fail safe operation in that, in the unlikely event of MRF valve failure, magnetorheological fluid flow is still permitted through the MRF valves 150, 152 with relatively little resistance. Consequently, should either or both of the MRF valves 150, 152 fail for any reason, the ability of MRF joystick resistance mechanism 64 to apply resistance forces restricting or inhibiting joystick motion may be compromised; however, the joystick 54 will remain freely rotatable about the X- and Y-axes in a manner similar to a traditional, non-MRF joystick system, and the MRF joystick device 52 will remain capable of controlling the FEL assembly 24 as typical.

In the depicted embodiment, the MRF valves 150, 152 each include a valve housing 154, which contains end caps 156 affixed over opposing ends of an elongated cylinder core 158. A generally annular or tubular flow passage 160 extends around the cylinder core 158 and between two fluid ports 162, 164, which are provided through the opposing end caps 156. The annular flow passage 160 is surrounded by (extends through) a number of EM inductor coils 166 (hereafter, "EM coils 166"), which are wound around paramagnetic holders 168 and interspersed with a number of axially- or longitudinally-spaced ferrite rings 170. A tubular shroud 172 surrounds this assembly, while a number of leads are provided through the shroud 172 to facilitate electrical interconnection with the housed EM coils 166. Two such leads, and the corresponding electrical connections to a power supply and control source 177, are schematically represented in FIGS. 5 and 6 by lines 174, 176. As indicated by arrows 179, the controller architecture 66 is operably coupled to the power supply and control source 177 in a manner enabling the controller architecture 66 to control the source 177 to vary the current supplied to or the voltage applied across the EM coils 166 during operation of the MRF joystick system 22. This structural arrangement thus allows the controller architecture 66 to command or control the MRF joystick resistance mechanism 64 to vary the strength of an EM field generated by the EM coils 166. The annular flow passage 160 extends through the EM coils 166 (and may be substantially co-axial therewith) such that the magnetorheological fluid passes through the center the EM field when as the magnetorheological fluid is conducted through the MRF valves 150, 152.

The fluid ports 162, 164 of the MRF valves 150, 152 are fluidly connected to the ports 146, 148 of the corresponding the MRF cylinders 126, 128 by the above-mentioned conduits 178, 180, respectively. The conduits 178, 180 may be, for example, lengths of flexible tubing having sufficient slack to accommodate any movement of the MRF cylinders 126, 128 occurring in conjunction with rotation of the joystick 54. Consider, in this regard, the example scenario of FIG. 6. In this example, an operator has moved the joystick handle 110 in an operator input direction (indicated by arrow 185) such that the joystick 54 rotates about the Y-axis of coordinate legend 118 in a clockwise direction. In combination with this joystick motion, the MRF cylinder 128 rotates about the spherical joint 145 to tilt slightly upward as shown. Also, along with this operator-controlled joystick motion, the piston 138, 140 contained in the MRF cylinder 128 retracts such that the piston head 138 moves to the left in FIG. 6 (toward the attachment point 132). The translation movement of the piston 138, 140 forces magnetorheological fluid flow through the MRF valve 152 to accommodate the volumetric decrease of the chamber on the left of the piston head 138 and the corresponding volumetric increase of the chamber to the right of the piston head 138. Consequently, at any point during such an operator-controlled joystick rotation, the controller architecture 66 can vary the current supplied to or the voltage across the EM coils 166 to vary the force resisting magnetorheological fluid flow through the MRF valve 152 and thereby achieve a desired MRF resistance force resisting further stroking of the piston 138, 140.

Given the responsiveness of MRF joystick resistance mechanism 64, the controller architecture 66 can control the resistance mechanism 64 to only briefly apply such an MRF resistance force, to increase the strength of the MRF resistance force in a predefined manner (e.g., in a gradual or stepped manner) with increasing piston displacement, or to provide various other resistance effects (e.g., a tactile detent or pulsating effect), as discussed in detail below. The controller architecture 66 can likewise control the MRF joystick resistance mechanism 64 to selectively provided such resistance effects as the piston 138, 140 included in the MRF valve 150 strokes in conjunction with rotation of the joystick 54 about the X-axis of coordinate legend 118. Moreover, the MRF joystick resistance mechanism 64 may be capable of independently varying the EM field strength generated by the EM coils 166 within the MRF valves 150, 152 to allow independent control of the MRF resistance forces inhibiting joystick rotation about the X- and Y-axes of coordinate legend 118.

The MRF joystick device 52 may further contain one or more joystick position sensors 182, 184 (e.g., optical or non-optical sensors or transformers) for monitoring the position or movement of the joystick 54 relative to the base housing 56. In the illustrated example, specifically, the MRF joystick device 52 includes a first joystick position sensor 182 (FIG. 5) for monitoring rotation of the joystick 54 about the X-axis of coordinate legend 118, and a second joystick position sensor 184 (FIG. 6) for monitoring rotation of the joystick 54 about the Y-axis of coordinate legend 118. The data connections between the joystick position sensors 182, 184 and the controller architecture 66 are represented by lines 186, 188, respectively. In further implementations, the MRF joystick device 52 can include various other non-illustrated components, as can the MRF joystick resistance mechanism 64. Such components can include operator inputs and corresponding electrical connections provided on the joystick 54 or the base housing 56, AFF motors, and pressure and/or flow rate sensors included in the flow circuit of the MRF joystick resistance mechanism 64, as appropriate, to best suit a particular application or usage.

As previously emphasized, the above-described embodiment of the MRF joystick device 52 is provided by way of non-limiting example only. In alternative implementations, the construction of the joystick 54 can differ in various respects. So too may the MRF joystick resistance mechanism 64 differ in further embodiments relative to the example shown in FIGS. 5 and 6, providing that the MRF joystick resistance mechanism 64 is controllable by the controller architecture 66 to selectively apply a resistance force (through changes in the rheology of a magnetorheological fluid) inhibiting movement of a joystick relative to a base housing in at least one DOF. In further realizations, EM inductor coils similar or identical to the EM coils 166 may be directly integrated into the MRF cylinders 126, 128 to provide the desired controllable MRF resistance effect. In such realizations, magnetorheological fluid flow between the variable volume chambers within a given MRF cylinder 126, 128 may be permitted via the provision of one or more orifices through the piston head 138, by providing an annulus or slight annular gap around the piston head 138 and the interior surfaces of the cylinder body 134, or by providing flow passages through the cylinder body 134 or sleeve itself. Advantageously, such a configuration may impart the MRF joystick resistance mechanism with a relatively compact, integrated design. Comparatively, the usage of one or more external MRF valves, such as the MRF valves 150, 152 (FIGS. 5 and 6), may facilitate cost-effective manufacture and allow the usage of commercially-available modular components in at least some instances.

In still other implementations, the design of the MRF joystick device may permit the magnetorheological fluid to envelop and act directly upon a lower portion of the joystick 54 itself, such as the spherical base 112 in the case of the joystick 54, with EM coils positioned around the lower portion of the joystick and surrounding the magnetological fluid body. In such embodiments, the spherical base 112 may be provided with ribs, grooves, or similar topological features to promote displacement of the magnetorheological fluid in conjunction with joystick rotation, with energization of the EM coils increasing the viscosity of the magnetorheological fluid to impede fluid flow through restricted flow passages provided about the spherical base 112 or, perhaps, due to sheering of the magnetorheological fluid in conjunction with joystick rotation. Various other designs are also possible in further embodiments of the MRF joystick system 22.

Regardless of the particular design of the MRF joystick resistance mechanism 64, the usage of MRF technology to selectively generate a variable MRF resistance force or joystick stiffness inhibiting (resisting or preventing) unintended joystick motions provides several advantages. As a primary advantage, the MRF joystick resistance mechanism 64 (and MRF joystick resistance mechanisms generally) are highly responsive and can effectuate desired changes in EM field strength, in the rheology of the magnetorheological fluid, and ultimately in the MRF-applied joystick stiffness inhibiting joystick motions in highly abbreviated time periods; e.g., time periods on the order of 1 millisecond in certain instances. Correspondingly, the MRF joystick resistance mechanism 64 may enable the MRF resistance force to be removed (or at least greatly reduced) with an equal rapidity by quickly reducing current flow through the EM coils and allowing the rheology of the magnetorheological fluid (e.g., fluid viscosity) to revert to its normal, unstimulated state. The controller architecture 66 can further control the MRF joystick resistance mechanism 64 to generate the MRF resistance force to have a continuous range of strengths or intensities, within limits, through corresponding changes in the strength of the EM field generated utilizing the EM coils 166. Beneficially, the MRF joystick resistance mechanism 64 can provide reliable, essentially noiseless operation over extended time periods. Additionally, the magnetorheological fluid can be formulated to be non-toxic in nature, such as when the magnetorheological fluid contains carbonyl iron-based particles dispersed in an alcohol-based or oil-based carrier fluid, as previously described. Finally, as a still further advantage, the above-described configuration of the MRF joystick resistance mechanism 64 allows the MRF joystick system 22 to selectively generate a first resistance force or joystick stiffness deterring joystick rotation about a first axis (e.g., the X-axis of coordinate legend 118 in FIGS. 5 and 6), while further selectively generating a second resistance force or joystick stiffness deterring joystick rotation about a second axis (e.g., the Y-axis of coordinate legend 118) independently of the first resistance force (joystick stiffness); that is, such that the first and second resistance forces have different magnitudes, as desired.

In accordance with embodiments of the present disclosure, the controller architecture 66 of the work vehicle MRF joystick system 22 may utilize the MRF joystick resistance mechanism 64 to control the RTC rate of the MRF joystick device 52 by selectively exerting an MRF-applied resistive force on the joystick 54, which is antagonistic to the centering force applied by the joystick bias mechanism contained within the joystick device 52; e.g., the return spring 124 shown in FIGS. 5 and 6. The controller architecture 66 may also control the MRF joystick resistance mechanism 64 to apply other effects, as well; e.g., to generate detent effects by temporarily increasing the MRF resistive force inhibiting impeding joystick motion when the joystick position corresponds to a predetermined detent location, as determined based on joystick position reported by the joystick position sensors 60. Accordingly, and utilizing the example described above in connection with FIGS. 3 and 4, the controller architecture 66 may command the MRF joystick resistance mechanism 64 to temporarily increase the MRF-applied resistance to joystick rotation about an axis parallel to the arrows 92, 94 when the joystick 54 is rotated into either of the positions marked by detent symbols 98, 100 (FIG. 4). This, in effect, creates the desired detent effect without the need for additional mechanical components or features otherwise utilized to provide detent effects; although the possibility that such detent features may be provided without the application of an MRF-applied resistance force in alternative implementations is not precluded.

In embodiments, the usage of the MRF joystick resistance mechanism 64 to generate the detent features utilized to activate the implement auto-movement functions (or, more broadly, any detent-triggered work vehicle function) can provide a high level of customization, if so desired. For example, in embodiments, a work vehicle operator may interact with the operator interface 72 to adjust the degree or level of resistive force encountered when moving through the detents 98, 100; to adjust the positioning of the detent features 98, 100 as encountered along the joystick range of travel in directions 88, 90; and/or to selectively turn-off (deactivate) one or both of the detents features 98, 100 if so desired. Similarly, an operator may interact with the operator interface 72 to activate other detents along other rotational axes (e.g., a detent encountered when rotating the joystick 54 in direction 92 or in direction 94) and, perhaps, to assign different work vehicle functions to such detent features. When an operator adjusts aspects of the detent features to preference, the operator preference settings may be stored in the memory 68 as part of the personalization settings data 82, which may be recalled and implemented when identifying a registered operator of the wheel loader 20; e.g., based on a pin or other information entered via the operator interface 72 uniquely identifying the registered operator when logging in to the loader operating system. So too may the controller architecture 66 automatically adjust such detent-related parameters or selectively active the detents in relation to any parameter monitored by the sensors of the wheel loader 20 or a particular operative mode of the loader 20, as further discussed below.

One modified centering mode usefully implemented by the controller architecture 66 in conjunction with activation of an implement auto-positioning or kickout function is the above-mentioned "auto-positioning mirror mode." The controller architecture 66 may automatically enter such an auto-positioning mirror mode when an operator activates an implement auto-positioning or "kickout" function via a predetermined motion of the joystick 54. An embodiment of the auto-position mirror mode will now be described in connection with FIG. 7, here performed in an example scenario in which an operator rotates the joystick 54 into or through the rearward detent feature 100 (FIG. 4) to activate the auto-positioning function raising the FEL bucket 26 into the upper preset position (FIG. 2). The following example notwithstanding, it is emphasized that the auto-positioning mirror mode can be applied in conjunction with the activation of any implement auto-positioning function (that is, any function in which an implement or tool of a work vehicle is automatically moved through three dimensional space to a preset position), with the implement auto-positioning function triggered through the motion of a self-centering MRF joystick device. Thus, the auto-positioning mirror mode may likewise be applied by the controller architecture 66 in conjunction with activation of the implement auto-positioning function moving the FEL bucket 26 into the lower preset position, as previously described.

Figure 7:
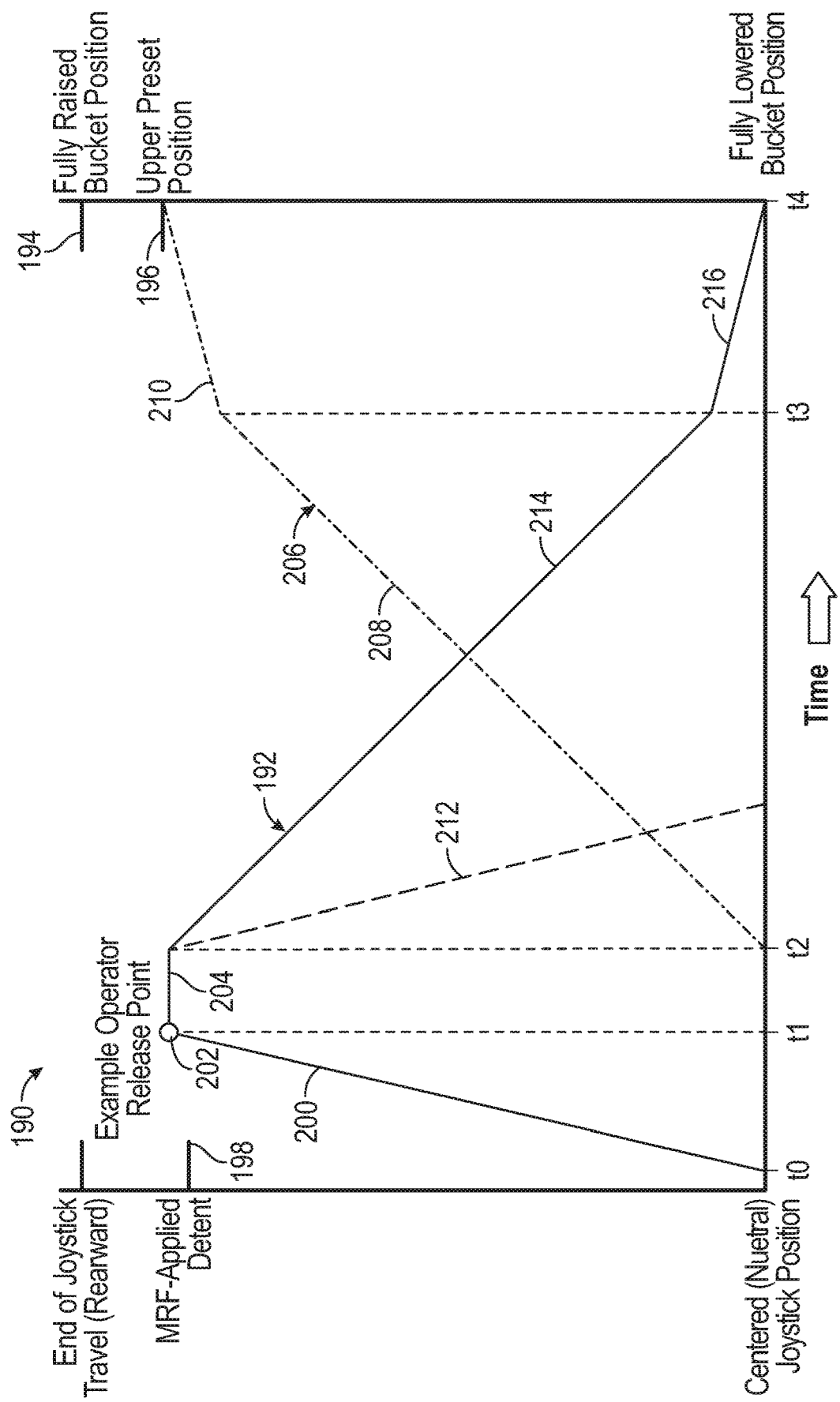
FIG. 7 is a graph illustrating an example timing sequence demonstrating one manner in which MRF joystick system may control the rate at which the joystick returns to the centered position to correspond with (e.g., be substantially proportional with) the rate at which the FEL bucket moves into a preset position when executing an implement auto-positioning (kickout) function.

Advancing to FIG. 7, there is shown an example movement timing diagram 190 indicating one manner in which the MRF joystick system 22 may vary the RTC rate of the joystick 54 to better correspond to implement movement (here, movement of the FEL bucket 26) during automated movement into an upper preset position performed pursuant to operator activation of an implement auto-positioning function. In this example, displacement of the joystick 54 from the centered (neutral) position in a rearward direction is plotted along a left vertical axis of the diagram 190, displacement of the FEL bucket 26 from a fully lowered position is plotted along a right vertical axis, and the passage of time is plotted along the horizontal axis. Increasing distance from the horizontal axis, as taken along the left vertical axis, thus corresponds to further displacement of the joystick 54 away from the centered (neutral) joystick position in a rearward direction. Comparatively, increasing distance from the horizontal axis of the diagram 190, as taken along the right vertical axis, corresponds to movement of the FEL bucket 26 in an upward direction away from the grounded bucket position and toward the fully raised bucket position. Finally, rightward movement from the origin (lower left corner) of the diagram 190 along the horizontal axis corresponds to the passage of time, with timepoints t0 through t4 marking the time at which key events occur, as further discussed below.

In the movement timing diagram 190, a first characteristic or profile 192 represents an example manner in which the joystick 54 may move when an operator: (i) initially moves the joystick 54 to activate or trigger an implement auto-positioning function raising the FEL bucket 26 to the upper preset position, and (ii) subsequently releases the joystick 54, which then returns to the center position under the influence of the centering force. In this example, the joystick 54 is located at the centered (neutral) joystick position at timepoint t0. The operator has previously set the upper preset position at an elevation located slightly below the fully raised bucket position, as indicated by the labeled hashmarks 194, 196 in the upper right of the diagram 190. To initiate the illustrated joystick motion sequence, an operator first rotates the joystick 54 of the MRF joystick device 52 in a manner triggering the implement auto-positioning function providing automated control of the FEL assembly 24 to raise the FEL bucket 26 to the upper preset position. The operator does this by rotating the joystick 54 in a rearward direction into or through an MRF-applied detent feature, the position of which is identified by hashmark 198 in FIG. 7 (the detent corresponding to the detent feature 100 shown in FIG. 4). This joystick motion occurs over timeframe t0-t1 and is represented by segment 200 of the joystick motion profile 192. The operator then releases the joystick 54 (or exerts minimal force thereon) in the example control scenario, as indicated by a marker 202. In certain embodiments, the controller architecture 66 may control the MRF joystick resistance mechanism 64 to apply a sufficient MRF-resistance force on the joystick 54 to create a hold detent (rather than a feel detent) at the location corresponding to the detent feature 100 (FIG. 4), in which case the joystick 54 may remain at the detent feature 100 or slightly beyond the detent feature 100 after operator release for a short duration of time. This is indicated in FIG. 7 by segment 204 of the joystick motion profile 192 spanning timeframe t1-t2. The implement auto-positioning function may be activated after timepoint t2, as described below. In other embodiments, such a brief joystick hold may not be provided, in which case segment 204 of the joystick motion profile 192 may be eliminated.

At timepoint t2, the implement auto-positioning function of the wheel loader 20 is activated in response to the previously-described joystick motion. A second characteristic or profile 206 (referenced to the right vertical axis of the diagram 190) represents the resulting movement of the FEL assembly 24 in an example scenario in which the FEL bucket 26 is located in a fully lowered position at timepoint t2. Momentarily setting aside a discussion of the joystick motion following timepoint t2, the controller architecture 66 (or another control system onboard the wheel loader 20) now transmits appropriate commands to the EH actuation system 50 to raise the FEL bucket 26 into the upper preset position, as previously set by the operator and defined by the preset position data 80 stored in the memory 68. The controller architecture 66 may simply command the EH actuation system 50 (more specifically, the valve actuators controlling hydraulic fluid exchange with the lift arm cylinders 44) to raise the FEL bucket 26 to the upper preset position at substantially constant rate in embodiments. Alternatively, as indicated in FIG. 7, the controller architecture 66 may command the EH actuation system 50 to initially raise the FEL bucket 26 at a substantially rapid rate (corresponding to segment 208 of the bucket movement profile 206) and then at a slower rate (corresponding to segment 210 of the profile 206) to provide a gradual ramp-down in FEL bucket motion when transition into the upper position preset. Stated differently, the implement (here, the FEL bucket 26) is automatically controlled to decelerate as the implement nears the first preset position during performance of the implement auto-positioning function. This transition between motion rates occurs at timepoint t3. Such an approach provides smooth FEL bucket motion and, in essence, a soft stop sequence to minimize the generation of shock forces when arresting FEL bucket motion upon reaching the upper preset position.

Returning to timepoint t2 in the movement timing diagram 190, a dashed line 212 generally indicates the manner in which the joystick 54 may rapidly return to the centered (neutral) position under the influence of the centering force following release by the operator (marker 202) and removal of the detent hold force (if applied) by the MRF joystick resistance mechanism 64. Absent the continued application of some level of MRF-generated resistance force, the joystick 54 will quickly returns to the centered (neutral) position under the centering force. The joystick 54 will thus come to rest at the centered (neutral) position well before timepoint t4 at which travel of the FEL bucket 26 into the upper preset position is completed. To avoid this rapid snapback of the joystick 54, the controller architecture 66 may operate in an auto-positioning mirror mode during which the controller architecture 66 varies the MRF resistive force applied to the joystick 54 to control the RTC rate of the joystick 54 when returning to the centered (neutral) position in conjunction with activation of an implement auto-positioning function. Accordingly, when operating in the auto-positioning mirror mode (and in the other modified centering modes described below), the controller architecture 66 may utilize the positing sensors 60 to determine when the joystick 54 initially begins return toward the centered position under influence of the centering force. Subsequently, in response to determining that the joystick 54 has begun return toward the centered position due to the centering force, the controller architecture 66 controls or command the MRF joystick resistance mechanism 64 to modify the rate at which the joystick 54 returns to the centered position by varying the MRF resistance force applied to the joystick 54.

In embodiments, the controller architecture 66 may command the MRF joystick resistance mechanism 64 to regulate the RTC rate of the joystick 54 to generally approximate, if not substantially match (that is, be substantially proportional with) the rate of movement of the FEL bucket 26 (or other implement attached to the terminal end of the FEL assembly 24). Accordingly, the controller architecture 66 may adjust the MRF-applied resistive force exerted on the joystick 54 and antagonistic to the centering force to achieve a moderate RTC rate over timeframe t2-t3 corresponding to the relatively rapid movement of the FEL bucket 26, as indicated by a segment 214 of the joystick motion profile 192. Subsequently, at timepoint t3, the controller architecture 66 may control the MRF joystick resistance mechanism 64 to further slow the RTC rate of the joystick 54 in a manner substantially corresponding to deceleration of the FEL bucket 26 over timeframe t3-t4 during the segment 210 of the implement movement profile 206. This is indicated in FIG. 7 by a final segment 216 of the joystick motion profile 192 extending from timepoint t3 to timepoint t4 and terminating with return of the joystick 54 at the centered (neutral) position. Further, both the joystick 54 and the FEL bucket 26 complete their respective motions at the same point in time and over a concurrent or substantially equivalent duration of time.

In the above-described manner, the RTC rate of the joystick 54 is controlled by controller architecture 66 and, more generally, by the MRF joystick system 22 to generally correspond with or mirror the implement motion when an implement (here, the FEL bucket 26) is automatically moved into a preset position pursuant to execution of an implement auto-positioning or kickout function. This may better maintain the relationship between joystick motion and implement movement during the implement auto-positioning function to improve operator experience and otherwise reduce confusion, which may otherwise occur in the case of operator unfamiliar with such work vehicle functions. The controller architecture 66 may determine the appropriate commands to transmit to the MRF joystick resistance mechanism 64 to achieve the desired RTC when operating in the above-described auto-positioning mirror mode in any suitable manner. For example, in certain embodiments, the controller architecture 66 may recall a predefined joystick movement profile from the memory 68 based on, for example, the particular type of implement auto-positioning function and the current vertical position of the FEL bucket 26 (or other boom assembly implement) when the implement auto-positioning function is triggered. In other instances, the controller architecture 66 may track the movement of the FEL bucket 26 (or other assembly implement) utilizing the boom assembly tracking sensors (included in the sensors 76), concurrently monitor the joystick position utilizing the joystick position sensors 60, and iteratively adjust the MRF-applied resistive force on a rapid (real-time) basis to ensure that the RTC rate of the joystick 54 generally corresponds to the rate of movement of the FEL bucket 26 as the implement auto-positioning function is executed. In still other instances, the controller architecture 66 may further consider one or more pressures within the actuation system 50 (as measured utilizing pressure sensor(s) within the sensors 76) in determining the appropriate manner in which to command the MRF joystick resistance mechanism 64 to achieve a desired RTC rate when operating in the auto-positioning mirror mode, as described above.

In embodiments, the MRF joystick system 22 may be operable in other modified centering modes in addition to or in lieu of the above-described auto-positioning mirror mode. For example, in certain instances, the MRF joystick system 22 may be operable in a modified centering mode in which the controller architecture 66 commands the MRF joystick resistance mechanism 64 to adjust the RTC rate of the joystick 54 based on operator preferences; e.g., as previously specified by an operator via data entry utilizing the operator interface 72. For example, in such embodiments, an operator may interact with a GUI generated on the display device 74 or another operator input device to slow the rate at which the joystick returns to center. An operator may be permitted to select a range of slower RTC rates in this case; or, perhaps, may selectively activate or deactivate a slow return mode in which a moderate RTC rate of the joystick is achieved via controlled application of the MRF joystick resistance force, the moderate RTC rate less than the RTC rate of the joystick when returning to center under normal conditions in the absence of a MRF resistance force applied via an MRF joystick resistance mechanism.

In other instances, the MRF joystick system 22 may automatically adjust the RTC rate of the joystick 54 based upon a current operating parameter of a work vehicle. As a first example, in the case of the wheel loader 20, the RTC rate of the joystick 54 may be adjusted based upon the current load carried by the FEL bucket 26 as measured directly utilizing a force sensor or indirectly based upon, for example, a hydraulic pressure within the EH actuation system 50 (with either or both sensors included in the non-joystick sensors 76). In one embodiment, the controller architecture 66 commands the MRF joystick resistance mechanism 64 to increase the MRF resistance force and slow the RTC rate of the joystick 54 (when displaced from the centered position) with increasing load placed on the wheel loader 20 or other work vehicle. As a second example, in the context of a joystick-steered work vehicle, the controller architecture 66 may vary the RTC rate of one or more MRF joystick devices within the work vehicle based on vehicle ground speed; e.g., the controller architecture 66 may command the MRF joystick resistance mechanism 64 to increase the MRF resistance force and slow the RTC rate of the joystick 54 with increasing vehicle ground speed. In still other implementations, the controller architecture 66 may adjust the RTC rate of the joystick 54 based upon a current operational mode of the work vehicle, based upon a particular work vehicle function currently performed by the work vehicle utilizing an MRF joystick device, or the type of implement currently attached to the work vehicle. The foregoing parameters can be determined automatically utilized the sensors 76, as appropriate, or instead based on operator input entered into a system of the work vehicle utilizing the operator interface 72.

Notably, in at least some embodiments (including in the presently-described example), the MRF joystick resistance mechanism 64 permits independent adjustment of the MRF resistance joystick forces resisting joystick motion about different rotational axes. In at least some instances, the controller architecture 66 may command the MRF joystick resistance mechanism 64 to provide a first RCT rate of the joystick 54 when displaced from the centered (neutral) position by rotation about a first axis, and a second (different) RCT rate of the joystick 54 when displaced from the centered (neutral) position by rotation about a second axis perpendicular to the first axis. Again returning to the example of wheel loader 20 and the execution of an implement auto-positioning function raising the FEL bucket 26 into the upper position preset, the controller architecture 66 may or may not modify the RTC rate of the joystick 54 when rotated about a first rotational axis to curl or uncurl the FEL bucket 26 (that is, when the joystick 54 is moved to the operator's left or right) in conjunction with modifying the joystick RTC rate along the opposing rotational axis, as previously described. In such embodiments, the controller architecture 66 thus commands the MRF joystick resistance mechanism 64 to modify a rate at which the joystick 54 returns to the centered position via rotation about a first axis, while independently varying rate at which the joystick 54 returns to the centered position via rotation about a second axis perpendicular to the first axis.

Figure 8:
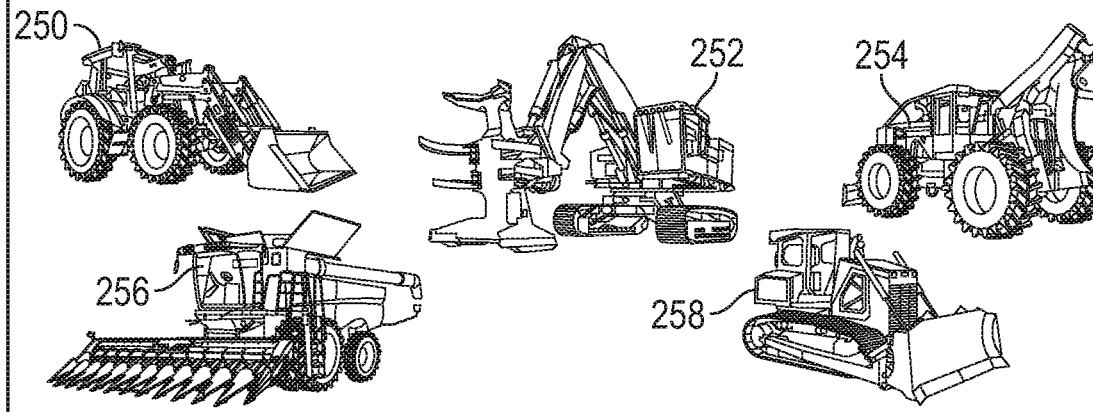
FIG. 8 is a graphic illustrating, in a non-exhaustive manner, additional example work vehicles into which embodiments of the MRF joystick system may be beneficially integrated.

Additional Examples of Work Vehicles Beneficially Equipped with MRF Joystick Systems The foregoing has thus described examples of MRF joystick systems operable in modified centering modes, such as auto-positioning mirror modes, in which the MRF joystick system varies the RTC rate of a self-centering joystick in a predefined manner. While the foregoing description principally focuses on a particular type of work vehicle (a wheel loader) including a particular joystick-controlled work vehicle function (FEL assembly movement), embodiments of the MRF joystick system described herein are amenable to integration into a wide range of work vehicles containing joystick devices. Three additional examples of such work vehicles are set-forth in the upper portion of FIG. 8 and include an excavator 217, a skid steer loader (SSL) 218, and a motor grader 220. Addressing first the excavator 217, the excavator 217 may be equipped with two example MRF joystick devices 222 located within the cabin 224 of the excavator 217. As indicated in FIG. 8, the MRF joystick devices 222 may be utilized to control the movement of a boom assembly 226 terminating in a bucket 228 or another implement (e.g., a grapple, a hydraulic hammer, or a different type of bucket). Additionally, one of the MRF joystick devices 222 may be utilized to control the swing of the boom assembly 226 via rotation of the excavator chassis relative to the tracked undercarriage thereof. The joystick devices 222 may also be able to steer or otherwise control the travel of the excavator 217 in instances in which the excavator 217 is operable in a joystick travel mode. Comparatively, two MRF joystick devices 230 may be located in the cabin 232 of the example SSL 218 and utilized to control not only the movement of the FEL 234 and its bucket 236, but further control movement of the chassis 238 of the SSL 218 in the well-known manner. Finally, the motor grader 220 likewise includes two MRF joystick devices 240 located within the cabin 242 of the motor grader 220. The MRF joystick devices 240 can be utilized to control the movement of the motor grader chassis 244 (through controlling a first transmission driving the motor grader rear wheels and perhaps a second (e.g., hydrostatic) transmission driving the forward wheels), as well as movement of the blade 246 of the motor grader; e.g., through rotation of and angular adjustments to the blade-circle assembly 248, as well as adjustments to the side shift angle of the blade 246.

In each of the above-mentioned examples, the MRF joystick devices can be controlled to modify the RTC rate of the joysticks under consideration. In this regard, any or all of the example excavator 217, the SSL 218, and the motor grader 220 can be equipped with a work vehicle MRF joystick system including at least one joystick device, an MRF joystick resistance mechanism, and a controller architecture. Further, as described above, the controller architecture may determine when a modified centering mode is appropriately applied and then adjust the MRF-applied resistance force antagonistic to the centering force accordingly. For example, any or all of the work vehicles 217, 218, 220 may be provided with an implement auto-positioning function triggered through joystick movement beyond a detent feature in a manner analogous to that described above in conjunction with the wheel loader 20. Thus, in such instances, the controller architecture may control the MRF joystick resistance mechanism to vary the RTC rate of the joystick (or joysticks) at issue to achieve a joystick return rate generally corresponding to automated movement of a movable implement into a preset position during execution of an implement auto-positioning or kickout function. Similarly, any or all of the work vehicles 217, 218, 220 may include MRF joystick systems permitting the rate of joystick return to be adjusted to operator preference and/or adjusting the rate of joystick return in response to variations in sensed parameter (e.g., load or speed) of the work vehicle. Finally, still further examples of work vehicles usefully equipped with embodiments of the MRF joystick systems described herein are illustrated in a bottom portion of FIG. 8 and include an FEL-equipped tractor 250, a feller buncher 252, a skidder 254, a combine 256, and a dozer 258.

Enumerated Examples of the Work Vehicle MRF Joystick System

The following examples of the work vehicle MRF joystick system are further provided and numbered for ease of reference.

1. In embodiments, the work vehicle MRF joystick system includes a joystick device, an MRF joystick resistance mechanism, and a controller architecture coupled to the MRF joystick resistance mechanism. The joystick device includes, in turn, a base housing, a joystick mounted to the base housing and movable relative thereto through a centered position, and a joystick bias mechanism coupled to the joystick and exerting a centering force urging the joystick to return to the centered position when the joystick is moved therefrom. The MRF joystick resistance mechanism is controllable to vary an MRF resistance force resisting movement of the joystick relative to the base housing in at least one degree of freedom. The controller architecture is operable in a modified centering mode in which the controller architecture: (i) determines when the joystick begins return toward the centered position due to the centering force applied to the joystick by the joystick bias mechanism; and (ii) in response to determining that the joystick begins return toward the centered position due to the centering force, command the MRF joystick resistance mechanism to modify a rate at which the joystick returns to the centered position by varying the MRF resistance force applied to the joystick.

2. The work vehicle MRF joystick system of example 1, wherein the work vehicle is equipped with an implement. The controller architecture is configured to enter the modified centering mode in conjunction with activation of a first implement auto-positioning function, which causes automatic movement of the implement into a first preset position.

3. The work vehicle MRF joystick system of example 2, wherein, when operating in the modified centering mode, the controller architecture commands the MRF joystick resistance mechanism to modify the rate at which the joystick returns to the centered position such that the joystick returns to the centered position substantially concurrently with movement of the implement into the first preset position.

4. The work vehicle MRF joystick system of example 2, wherein, when operating in the modified centering mode, the controller architecture commands the MRF joystick resistance mechanism to modify the rate at which the joystick returns to the centered position to be substantially proportional with the rate at which the implement moves from a current position into the first preset position.

5. The work vehicle MRF joystick system of example 4, wherein implement decelerates as the implement nears the first preset position during performance of the implement auto-positioning function. When operating in the modified centering mode, the controller architecture commands the MRF joystick resistance mechanism to further increase the MRF resistance force applied to the joystick substantially concurrently with deceleration of the implement.

6. The work vehicle MRF joystick system of example 2, wherein the controller architecture is configured to activate the first implement auto-positioning function in response to a predefined movement of the joystick.

7. The work vehicle MRF joystick system of example 6, wherein the predefined movement of the joystick includes rotation of the joystick into or through a detent feature of the joystick device.

8. The work vehicle MRF joystick system of example 7, wherein the controller architecture is configured to generate the detent feature by commanding the MRF joystick resistance mechanism to increase the MRF resistance force when an operator moves the joystick into a predetermined position corresponding to the detent feature.

9. The work vehicle MRF joystick system of example 2, wherein the implement is joined to the work vehicle by a boom assembly. The joystick is rotatable relative to the base housing in forward and rearward directions to move the boom assembly in a manner lowering and raising the implement, respectively. Further, the first preset position is an upper preset position, while the first implement auto-positioning function is activated by moving the joystick into or through a first detent feature encountered when rotating the joystick away from the centered position in a rearward direction.

10. The work vehicle MRF joystick system of example 9, wherein the controller architecture is further configured to enter the modified centering mode in conjunction with activation of a second implement auto-positioning function, which causes automatic movement of the implement into a lower preset position. The second implement auto-positioning function is activated by moving the joystick into or through a second detent feature encountered when rotating the joystick away from the centered position in a forward direction.

11. The work vehicle MRF joystick system of example 1, wherein the work vehicle is equipped with a movable implement. When operating in the modified centering mode, the controller architecture commands the MRF joystick resistance mechanism to modify a rate at which the joystick returns to the centered position to correspond to a rate of motion of the movable implement.

12. The work vehicle MRF joystick system of example 1, wherein the joystick is rotatable relative to the base housing about a first axis and a second axis perpendicular to the first axis. When operating in the modified centering mode, the controller architecture commands the MRF joystick resistance mechanism to modify a rate at which the joystick returns to the centered position via rotation about the first axis, while independently varying rate at which the joystick returns to the centered position via rotation about the second axis.

13. The work vehicle MRF joystick system of example 1, further including a sensor coupled to the controller architecture and configured to measure a parameter indicative of a current load of the work vehicle. When operating in the modified centering mode, the controller architecture commands the MRF joystick resistance mechanism to modify the rate at which the joystick returns to the centered position based, at least in part, on the current load of the work vehicle.

14. The work vehicle MRF joystick system of example 1, further including a sensor coupled to the controller architecture and configured to measure a current speed of the work vehicle. When operating in the modified centering mode, the controller architecture commands the MRF joystick resistance mechanism to modify the rate at which the joystick returns to the centered position based, at least in part, on the current speed of the work vehicle.

15. The work vehicle MRF joystick system of example 1, further including a memory storing operator preference settings indicating an operator-preferred return to center rate of the joystick. When operating in the modified centering mode, the controller architecture commands the MRF joystick resistance mechanism to modify the rate at which the joystick returns to the centered position in accordance with the operator preference settings.

CONCLUSION

The foregoing has thus provided work vehicle MRF joystick systems operable in modified centering modes, which intelligently control the rate of return of a self-centering joystick to a centered position after displacement therefrom. Embodiment of the MRF joystick systems may thus allow the RTC rate of a joystick to be adjusted to preference or to adapt dynamically in response to changes in a work vehicle operational parameter, operational mode, or other condition. Additionally, in certain embodiments, the MRF joystick systems are operable in an auto-positioning mirror mode in which the MRF joystick system adjusts the RTC rate of a joystick to generally correspond to, if not be substantially proportional with the movement of an implement when transitioning from a current position to a preset position during execution of an implement auto-positioning or "kickout" function. This favorably improves correlation between joystick motion and implement movement during execution of a given implement auto-positioning function to reduce the likelihood of operator confusion or otherwise enhance operator experience. Various other benefits are obtained by embodiments of the work vehicle MRF joystick systems, as described above.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle magnetorheological fluid (MRF) joystick system for usage onboard a work vehicle, the work vehicle MRF joystick system comprising:
   a joystick device, comprising:
      a base housing;
      a joystick mounted to the base housing and movable relative thereto through a centered position; and
      a joystick bias mechanism coupled to the joystick and exerting a centering force urging the joystick to return to the centered position when the joystick is moved therefrom;
   an MRF joystick resistance mechanism controllable to vary an MRF resistance force resisting movement of the joystick relative to the base housing in at least one degree of freedom; and
   a controller architecture coupled to the MRF joystick resistance mechanism, the controller architecture operable in a modified centering mode in which the controller architecture:
      determines when the joystick begins return toward the centered position due to the centering force applied to the joystick by the joystick bias mechanism; and
      in response to determining that the joystick begins return toward the centered position due to the centering force, commands the MRF joystick resistance mechanism to modify a rate at which the joystick returns to the centered position by varying the MRF resistance force applied to the joystick.

2. The work vehicle MRF joystick system of claim 1, wherein the work vehicle is equipped with an implement; and
   wherein the controller architecture is configured to enter the modified centering mode in conjunction with activation of a first implement auto-positioning function, which causes automatic movement of the implement into a first preset position.

3. The work vehicle MRF joystick system of claim 2, wherein, when operating in the modified centering mode, the controller architecture commands the MRF joystick resistance mechanism to modify the rate at which the joystick returns to the centered position such that the joystick returns to the centered position substantially concurrently with movement of the implement into the first preset position.

4. The work vehicle MRF joystick system of claim 2, wherein, when operating in the modified centering mode, the controller architecture commands the MRF joystick resistance mechanism to modify the rate at which the joystick returns to the centered position to be substantially proportional with the rate at which the implement moves from a current position into the first preset position.

5. The work vehicle MRF joystick system of claim 4, wherein implement decelerates as the implement nears the first preset position during performance of the implement auto-positioning function; and
   wherein, when operating in the modified centering mode, the controller architecture commands the MRF joystick resistance mechanism to further increase the MRF resistance force applied to the joystick substantially concurrently with deceleration of the implement.

6. The work vehicle MRF joystick system of claim 2, wherein the controller architecture is configured to activate the first implement auto-positioning function in response to a predefined movement of the joystick.

7. The work vehicle MRF joystick system of claim 6, wherein the predefined movement of the joystick comprises rotation of the joystick into or through a detent feature of the joystick device.

8. The work vehicle MRF joystick system of claim 7, wherein the controller architecture is configured to generate the detent feature by commanding the MRF joystick resistance mechanism to increase the MRF resistance force when an operator moves the joystick into a predetermined position corresponding to the detent feature.

9. The work vehicle MRF joystick system of claim 2, wherein the implement is joined to the work vehicle by a boom assembly;
   wherein the joystick is rotatable relative to the base housing in forward and rearward directions to move the boom assembly in a manner lowering and raising the implement, respectively;
   wherein the first preset position comprises an upper preset position; and
   wherein the first implement auto-positioning function is activated by moving the joystick into or through a first detent feature encountered when rotating the joystick away from the centered position in a rearward direction.

10. The work vehicle MRF joystick system of claim 9, wherein the controller architecture is further configured to enter the modified centering mode in conjunction with activation of a second implement auto-positioning function, which causes automatic movement of the implement into a lower preset position;
   wherein the second implement auto-positioning function is activated by moving the joystick into or through a second detent feature encountered when rotating the joystick away from the centered position in a forward direction.

11. The work vehicle MRF joystick system of claim 1, wherein the work vehicle is equipped with a movable implement; and
wherein, when operating in the modified centering mode, the controller architecture commands the MRF joystick resistance mechanism to modify a rate at which the joystick returns to the centered position to correspond to a rate of motion of the movable implement.

12. The work vehicle MRF joystick system of claim 1, wherein the joystick is rotatable relative to the base housing about a first axis and a second axis perpendicular to the first axis;
wherein, when operating in the modified centering mode, the controller architecture commands the MRF joystick resistance mechanism to modify a rate at which the joystick returns to the centered position via rotation about the first axis, while independently varying rate at which the joystick returns to the centered position via rotation about the second axis.

13. The work vehicle MRF joystick system of claim 1, further comprising a sensor coupled to the controller architecture and configured to measure a parameter indicative of a current load of the work vehicle;
wherein, when operating in the modified centering mode, the controller architecture commands the MRF joystick resistance mechanism to modify the rate at which the joystick returns to the centered position based, at least in part, on the current load of the work vehicle.

14. The work vehicle MRF joystick system of claim 1, further comprising a sensor coupled to the controller architecture and configured to measure a current speed of the work vehicle;
wherein, when operating in the modified centering mode, the controller architecture commands the MRF joystick resistance mechanism to modify the rate at which the joystick returns to the centered position based, at least in part, on the current speed of the work vehicle.

15. The work vehicle MRF joystick system of claim 1, further comprising a memory storing operator preference settings indicating an operator-preferred return to center rate of the joystick; and
wherein, when operating in the modified centering mode, the controller architecture commands the MRF joystick resistance mechanism to modify the rate at which the joystick returns to the centered position in accordance with the operator preference settings.

16. A work vehicle magnetorheological fluid (MRF) joystick system for usage onboard a work vehicle equipped with boom assembly terminating in an implement, the work vehicle MRF joystick system comprising:
a joystick device, comprising:
a base housing;
a joystick mounted to the base housing and movable relative thereto through a centered position; and
a joystick bias mechanism coupled to the joystick and exerting a centering force urging the joystick to return to the centered position when the joystick is moved therefrom;
an MRF joystick resistance mechanism controllable to vary an MRF resistance force resisting movement of the joystick relative to the base housing; and
a controller architecture coupled to the MRF joystick resistance mechanism, the controller architecture configured to:
determine when a first implement auto-positioning function of the work vehicle has been activated by movement of the joystick; and
when determining that the first implement auto-positioning function of the work vehicle has been activated, (i) command the boom assembly to move the implement from a current position to a preset position, and (ii) control the MRF joystick resistance mechanism to adjust the MRF resistance force and vary a rate at which the joystick returns to the centered position as the implement moves from the current position to the preset position.

17. The work vehicle MRF joystick system of claim 16, wherein the controller architecture is configured to determine when the implement auto-positioning function has been activated based, at least in part, on movement of the joystick into or through a detent feature of the joystick device; and
wherein the controller architecture generates the detent feature of the joystick device utilizing the MRF joystick resistance mechanism.

18. The work vehicle MRF joystick system of claim 16, wherein the controller architecture is configured to controls the MRF joystick resistance mechanism to vary the rate at which the joystick returns to the centered position in a manner substantially proportional with movement of the implement from the current position to the preset position.

19. The work vehicle MRF joystick system of claim 16, wherein work vehicle, the boom assembly, and the implement comprise a loader, a Front End Loader (FEL) assembly, and an FEL bucket, respectively;
wherein the joystick is rotatable relative to the base housing in a rearward direction to command the FEL assembly to raise the FEL bucket;
wherein the preset position comprises an upper preset position; and
wherein the controller architecture is configured to activate the implement auto-positioning function in response to movement of the joystick into or through a detent feature encountered when rotating the joystick away from the centered position in the rearward direction.

20. The work vehicle MRF joystick system of claim 16, wherein work vehicle, the boom assembly, and the implement comprise a loader, a Front End Loader (FEL) assembly, and an FEL bucket, respectively;
wherein the joystick is rotatable relative to the base housing in a forward direction to command the FEL assembly to lower the FEL bucket;
wherein the preset position comprises a lower preset position; and
wherein the controller architecture is configured to activate the implement auto-positioning function in response to movement of the joystick into or through a detent feature encountered when rotating the joystick away from the centered position in the forward direction.

* * * * *